United States Patent
Alvarez et al.

(10) Patent No.: US 11,702,105 B2
(45) Date of Patent: Jul. 18, 2023

(54) TECHNOLOGY TO GENERALIZE SAFE DRIVING EXPERIENCES FOR AUTOMATED VEHICLE BEHAVIOR PREDICTION

(71) Applicant: Intel Corporation, Santa Clara, CA (US)

(72) Inventors: Ignacio J. Alvarez, Portland, OR (US); Vy Vo, Portland, OR (US); Javier Felip Leon, Hillsboro, OR (US); Javier Perez-Ramirez, North Plains, OR (US); Javier Sebastian Turek, Beaverton, OR (US); Mariano Tepper, Portland, OR (US); David Israel Gonzalez Aguirre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 16/914,298

(22) Filed: Jun. 27, 2020

(65) Prior Publication Data

US 2021/0001884 A1    Jan. 7, 2021

(51) Int. Cl.
*B60W 60/00* (2020.01)
*G06N 3/08* (2023.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC ........ B60W 60/0015; B60W 60/0011; B60W 30/09; B60W 30/0956; B60W 40/06;
(Continued)

(56) References Cited

U.S. PATENT DOCUMENTS

2019/0004538 A1*   1/2019   Wood .............. G01S 17/931
2019/0179328 A1*   6/2019   Movert ............. G06F 16/29
(Continued)

OTHER PUBLICATIONS

A. Banino et al., "Vector-based navigation using grid-like representations in artificial agents," <discovery.ucl.ac.uk/id/eprint/10048194/1/Barry%20_Banino_at_al_final.pdf>,88 pages, retrieved Oct. 21, 2020.
(Continued)

*Primary Examiner* — Behrang Badii
*Assistant Examiner* — Jay Khandpur
(74) *Attorney, Agent, or Firm* — Jordan IP Law, LLC

(57) ABSTRACT

Systems, apparatuses and methods may provide for technology that generates, via a first neural network such as a grid network, a first vector representing a prediction of future behavior of an autonomous vehicle based on a current vehicle position and a vehicle velocity. The technology may also generate, via a second neural network such as an obstacle network, a second vector representing a prediction of future behavior of an external obstacle based on a current obstacle position and an obstacle velocity, and determine, via a third neural network such as a place network, a future trajectory for the vehicle based on the first vector and the second vector, the future trajectory representing a sequence of planned future behaviors for the vehicle. The technology may also issue actuation commands to navigate the autonomous vehicle based on the future trajectory for the vehicle.

25 Claims, 13 Drawing Sheets

(51) Int. Cl.
*G06N 5/02* (2023.01)
*G01C 21/34* (2006.01)
*B60W 30/095* (2012.01)
*B60W 40/06* (2012.01)
*B60W 30/09* (2012.01)

(52) U.S. Cl.
CPC ........ *B60W 40/06* (2013.01); *B60W 60/0011* (2020.02); *G01C 21/3407* (2013.01); *G06N 3/08* (2013.01); *G06N 5/02* (2013.01); *B60W 2552/00* (2020.02); *B60W 2554/4041* (2020.02); *B60W 2554/4042* (2020.02); *B60W 2555/00* (2020.02)

(58) Field of Classification Search
CPC ..... B60W 2554/4041; B60W 2552/00; B60W 2554/4042; B60W 2555/00; G01C 21/3407; G06N 3/08; G06N 5/02
See application file for complete search history.

(56) References Cited

U.S. PATENT DOCUMENTS

| | | | | |
|---|---|---|---|---|
| 2019/0283746 | A1* | 9/2019 | Shalev-Shwartz ... | G05D 1/0221 |
| 2020/0086879 | A1* | 3/2020 | Lakshmi Narayanan ................... | G06V 40/20 |
| 2020/0238999 | A1* | 7/2020 | Batts ........................ | E01C 23/01 |
| 2020/0307563 | A1* | 10/2020 | Ghafarianzadeh ..... | G06V 20/58 |
| 2021/0291866 | A1* | 9/2021 | Smith ..................... | G06V 20/56 |
| 2021/0300412 | A1* | 9/2021 | Dingli ............... | B60W 50/0098 |
| 2021/0331677 | A1* | 10/2021 | Kim ..................... | B60W 40/10 |

OTHER PUBLICATIONS

J. Bellmund et al., "Navigating cognition: Spatial codes for human thinking," <science.sciencemag.org/content/sci/362/6415/eaat6766.full.pdf>, 13 pages, 2018.

A. Bicanski et al., "A neural-level model of spatial memory and imagery," <elifesciences.org/articles/33752>, Sep. 4, 2018, 45 pages.

F. Codevilla et al., "End-to-end driving via conditional imitation learning," Mar. 2, 2018, 8 pages, <arxiv.org/pdf/1710.02410.pdf>.

A. Dosovitskiy et al., "CARLA: An open urban driving simulator," Nov. 10, 2017, 16 pages, <arxiv.org/pdf/1711.03938.pdf>.

R. Gulli et al., "Context-dependent representations of objects and space in the primate hippocampus during virtual navigation," <www.tsolab.org/jclub/20200302/gulli20.pdf>, Jan. 2020, pp. 103-112.

M. Henne et al., "Benchmarking Uncertainty Estimation Methods for Deep Learning With Safety-Related Metrics," <ceur-ws.org/Vol-2560/paper35.pdf>, retrieved Oct. 21, 2020, 8 pages.

Z. Li et al., "Rethinking self-driving: Multi-task knowledge for better generalization and accident explanation ability," Sep. 28, 2018, 11 pages, <arxiv.org/pdf/1809.11100.pdf>.

P. Mirowski et al., "Learning to navigate in complex environments," Jan. 13, 2017, 16 pages, <https://arxiv.org/pdf/1611.03673.pdf>.

D. Nister et al., "An Introduction to the Safety Force Field," NVIDIA, <nvidia.com/content/dam/en-zz/Solutions/self-driving-cars/safety-force-field/an-introduction-to-the-safety-force-field-v2.pdf>, retrieved Oct. 21, 2020, 27 pages.

N. Savinov et al., "Semi-parametric topological memory for navigation," Mar. 1, 2018, 16 pages, <arxiv.org/pdf/1803.00653.pdf>.

S. Shalev-Shwartz et al., "On a formal model of safe and scalable self-driving cars," Oct. 27, 2018, 37 pages, <arxiv.org/pdf/1708.06374.pdf>.

K. Stachenfeld et al., "The hippocampus as a predictive map," Nov. 2017, pp. 1643-1651, <gershmanlab.webfactional.com/pubs/Stachenfeld17.pdf>.

Y. Uchida et al., "Embedding Watermarks into Deep Neural Networks," 2017 ACM on International Conference on Multimedia Retrieval (ICMR '17), Apr. 20, 2017, 10 pages, <arxiv.org/pdf/1701.04082.pdf>.

* cited by examiner

TECHNOLOGY TO GENERALIZE SAFE DRIVING EXPERIENCES FOR AUTOMATED VEHICLE BEHAVIOR PREDICTION

TECHNICAL FIELD

Embodiments generally relate to automated control systems. More particularly, embodiments relate to technology for automated vehicle control systems that encodes safe driving knowledge into cognitive spaces and evaluates a current driving scene against previously learned driving knowledge.

BACKGROUND

Automated control systems may be used in a variety of environments such as, for example, autonomous vehicle systems. Autonomous vehicle environments, however, pose difficult challenges. While human drivers are, in general, good at evaluating unforeseen driving situations and making correct safety judgements that maintain a good balance between safety and utility, automated driving systems are unable to handle such a task as well as humans. The system logic that controls these decisions, known as driving policy, is usually difficult to generalize to all driving situations. Decision-making depends on the perceived environmental factors taken into consideration as well as some internalized driving rules that might be expressed in logic or learned through examples. Some driving policy approaches, thus, make use of rule sets for collision avoidance and path following as well as traffic signal restraints. Other approaches are based on statistical learning to build internal representations from raw data as function approximations to the mapping from sensor input to control commands across diverse and noisy conditions. A number of these approaches, however—such as deep learning—often struggle from data-poor problems where the underlying structure is characterized by sparse but complex relations. Some approaches, furthermore, that perform safety checks based on kinematic-derived formulas and encode common driving rules may be generalizable to multiple road geometries and driving situations, but if the particular driving environment is different than the assumptions made about behaviors, those behaviors will be radically different to those of the surrounding vehicles creating overly cautions behaviors in the best case or dangerously aggressive ones in other cases.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

In general, embodiments provide a driving policy architecture (i.e., subsystem) for an autonomous vehicle system that generalizes driving behavior knowledge for automated vehicles to handle previously unseen driving conditions safely. Embodiments also provide for encoding safe driving knowledge into cognitive spaces in the learning phase for the driving policy. Additionally, embodiments include technology that will determine similarity scores between current situations and previous experiences by measuring activation time in grid cells triggering recall experiences, where weights may be assigned to recalled experiences depending on location, agent similarity and external conditions.

More particularly, embodiments use a multi-network structure in which a place cell-like network is trained on inputs received from a grid cell-like network and/or an obstacle-like network. A reward function may be provided (e.g., via a safety supervisor) based on safety measurements on the output of the place network. At runtime, the grid network predicts behavior of the ego-vehicle, while one or more obstacle networks predict behavior of other vehicles in the vicinity of the ego vehicle. The place network determines a trajectory of the ego-vehicle based on external input as well as the response from the grid and obstacle networks.

Learning Navigation Tasks in the Hippocampus: Cognitive Spaces

In embodiments, the driving policy, and its architecture, may function analogously to the hippocampus region in the human brain. The hippocampal formation is an area in the brain that is critical for memory and spatial navigation. It has been proposed that place cells and grid cells in the hippocampal-entorhinal system form representations of cognitive maps as a way to remember the geometric relationships between different abstract features. See Bellmund, J. L., Gärdenfors, P., Moser, E. I., & Doeller, C. F, Navigating cognition: Spatial codes for human thinking, Science, Vol. 362 No. 6415 (Nov. 9, 2018), eaat6766. Place cells in the hippocampus are active when an animal occupies one position in a particular environment. By contrast, grid cells are context-independent, and fire at regular hexagonal grid points in any environment Grid cells are thought to provide a coordinate system of the environment, while place cells provide egocentric position information for self-localization. Together, the activation of place and cell grids contains enough information to navigate Euclidean space, or more generally, a given cognitive space.

Figure 1:
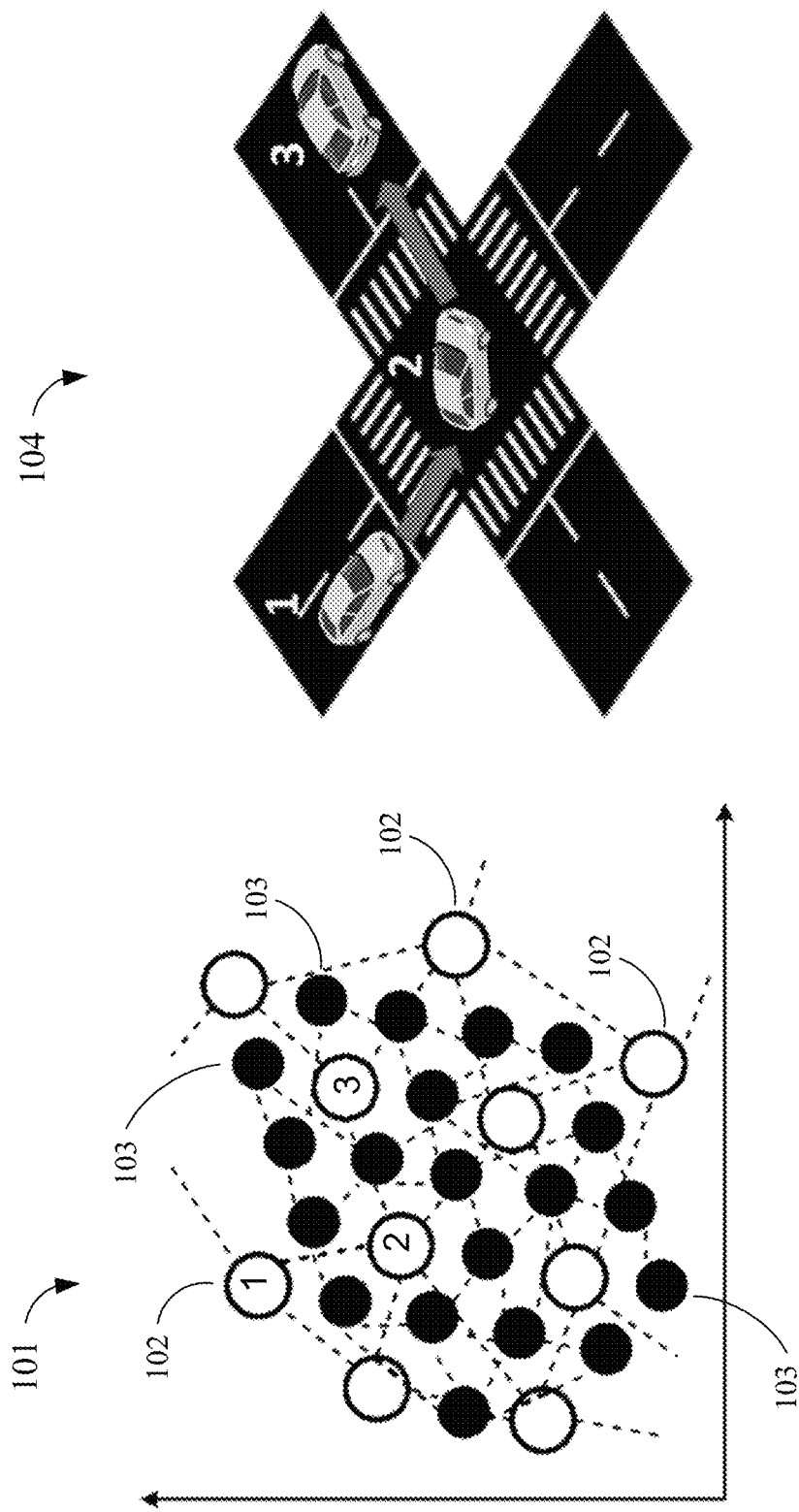
FIG. 1 is a diagram illustrating a 2-dimensional representation of the distribution of place cells and grid cells in the hippocampus and a mapping of vehicle position and movement.

FIG. 1 is a diagram illustrating a 2-dimensional representation of the distribution of place cells and grid cells in the hippocampus (left, label 101). As shown in the left side of FIG. 1, place cells 102 are represented by the larger white circles, with interconnections between place cells shown in dotted lines. Also illustrated in the left side of the figure are grid cells 103, represented by the smaller black circles, with interconnections between grid cells shown in dotted lines. As shown in the right side of FIG. 1 (label 104), an intersection is illustrated with a vehicle positioned at several points within the intersection such as, e.g., if the vehicle is driving through the intersection and making a left turn. The position of a car in the intersection can be mapped to the location of the active place-cells and the movement (actions) to activation patterns of the grid cells. Numbers of the position of the car correspond to the spatial mapping of the car in the hippocampal network (see markings 1, 2 and 3).

Figure 2:
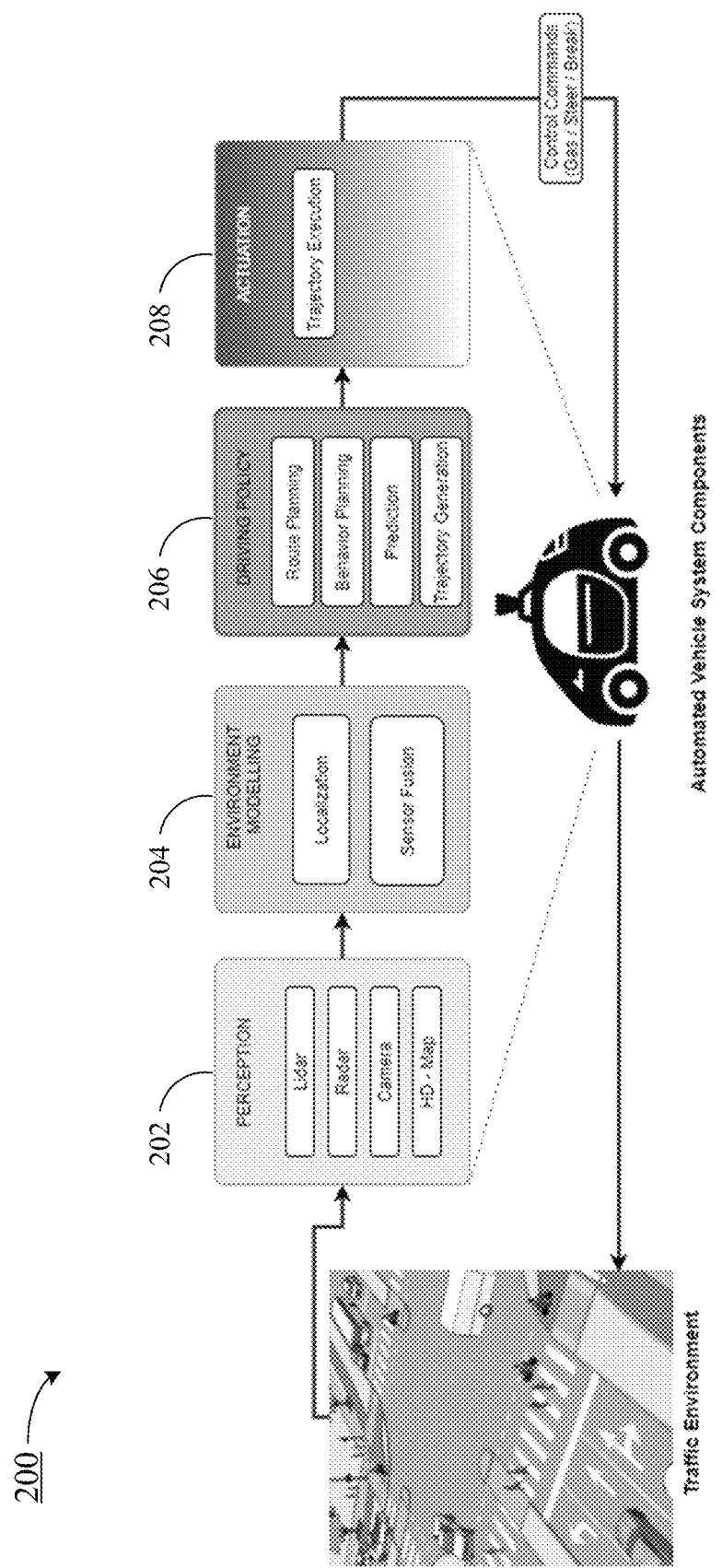
FIG. 2 is a diagram illustrating components of an example of an autonomous vehicle system according to one or more embodiments.

Automated driving systems may operate via a perception, planning, and actuation cycle where a system composed of a range of sensors (e.g. cameras, radar, lidar, IMU, GPS, etc.) create a virtual representation of the world and a decision logic system, i.e. driving policy, plans a general route from origin to destination and determines short term trajectories to navigate obstacles, preserving the vehicle integrity while respecting traffic rules. FIG. 2 is a diagram illustrating components of an example of an autonomous vehicle system 200 according to one or more embodiments, with reference to components and features described herein including but not limited to the figures and associated description. The autonomous vehicle system 200 may include several modules or subsystems, including a perception module 202, an environmental module 204, a driving policy module 206 and an actuation module 208. The perception module 202 and the environmental module 204 may collect perceptual features via sensors (e.g. lidar, radar, camera, and location information) and process them to get localization and kinematic information pertaining to obstacles (e.g., relevant agents and objects) in the ego vehicle's environment. This information may be provided as input to the driving policy module 206, which may implement features of the driving policy architecture described in more detail in the following figures. The output of the driving policy module 206 may be provided as input to the actuation module 208, which may carry out actuation commands for controlling steering, acceleration, and/or braking functions of the autonomous vehicle.

Cognitive-Map Based Driving Policy

Figure 3:
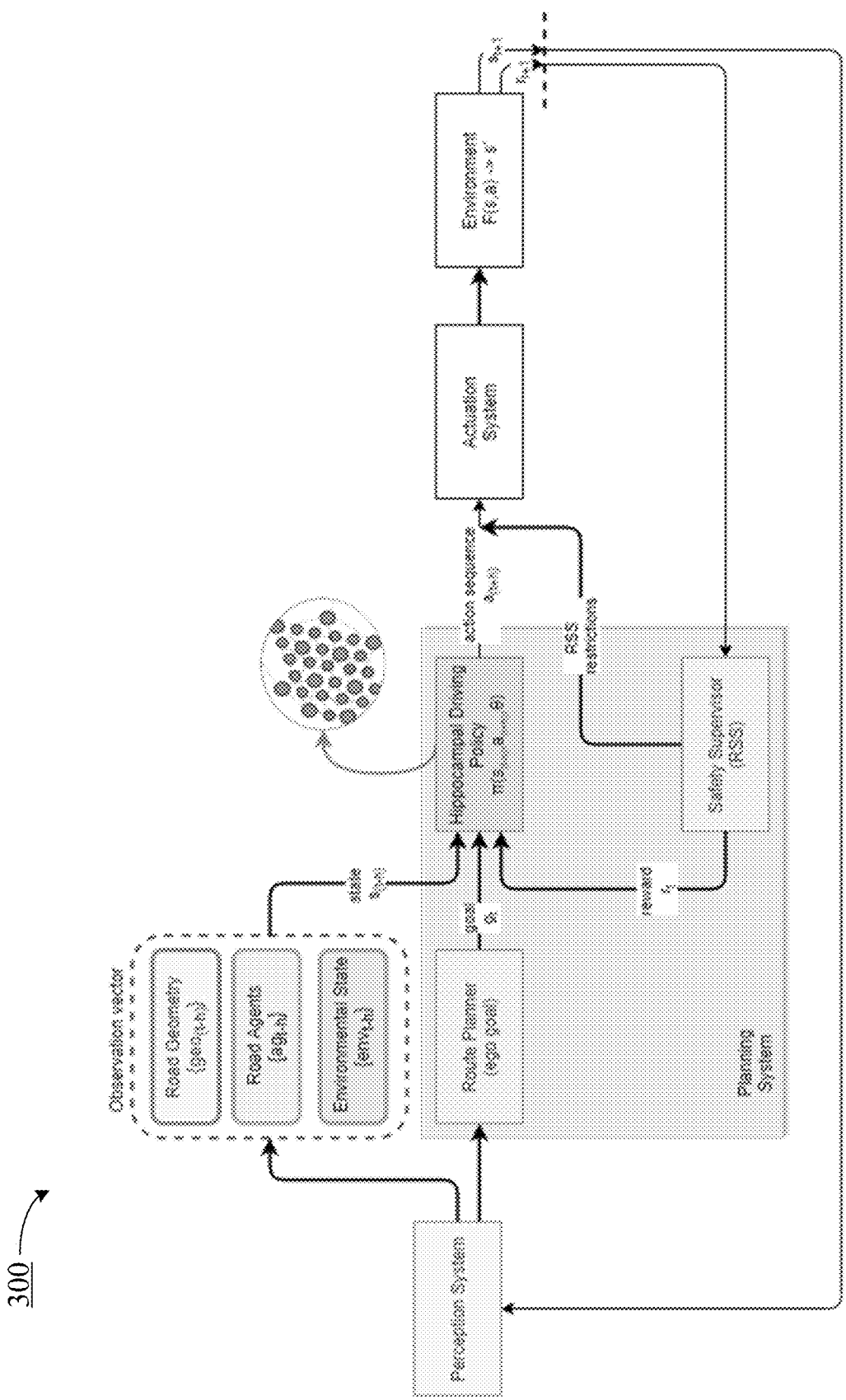
FIG. 3 is a diagram further illustrating aspects of an example of an autonomous vehicle system according to one or more embodiments.

FIG. 3 is a diagram 300 further illustrating aspects of an example of an autonomous vehicle system according to one or more embodiments, with reference to components and features described herein including but not limited to the figures and associated description. As shown in a high-level overview in the figure, a driving policy architecture may operate in an automated driving system to navigate safely in the presence of other vehicles using a cognitive space to recall generalized knowledge. Sensor and other inputs may be encoded into an observation vector that includes road geometry, sequences of previous actions for other road agents up to a given time horizon, and environmental conditions (e.g. raining, sunny). Embodiments of the driving policy architecture may provide a future action sequence for the ego vehicle within a specified time horizon, which is passed to the actuation system for command input. Besides the vehicle goal provided, e.g., by a route planner, a safety supervisor component may be incorporated with the driving policy that reads the sequence of commands and, if necessary, applies restrictions on the commands to provide for safety guarantees. For example, embodiments may integrate with the Responsibility-Sensitive Safety (RSS) mathematical framework, introduced by Intel® and Mobileye for autonomous vehicle operation, to perform safety checks with surrounding agents and provide active restrictions to the driving policy. In embodiments, a safety reward value may be applied to the driving policy, e.g. via RSS, based on the ego vehicle's trajectory generated by the driving policy. In some embodiments, a similar safety reward could be obtained by measuring minimum distance to surrounding vehicles and maximizing reward for longer distances or by providing some traffic rules heuristics and monitoring adherence to these rules. Safety criteria may generally be understood to include rules or guidelines for collision avoidance, for example by establishing a minimum distance metric during a particular situation. Safety criteria may also include local rules of the road such as maximum speed in the road segment, respecting signals, and/or allowing—or prohibiting—certain maneuvers (e.g., at intersections). Local rules of the road are not necessarily limited to safety and may include local behaviors. In some embodiments, local rules of the road may be provided as a separate list or other data input.

Figure 4:
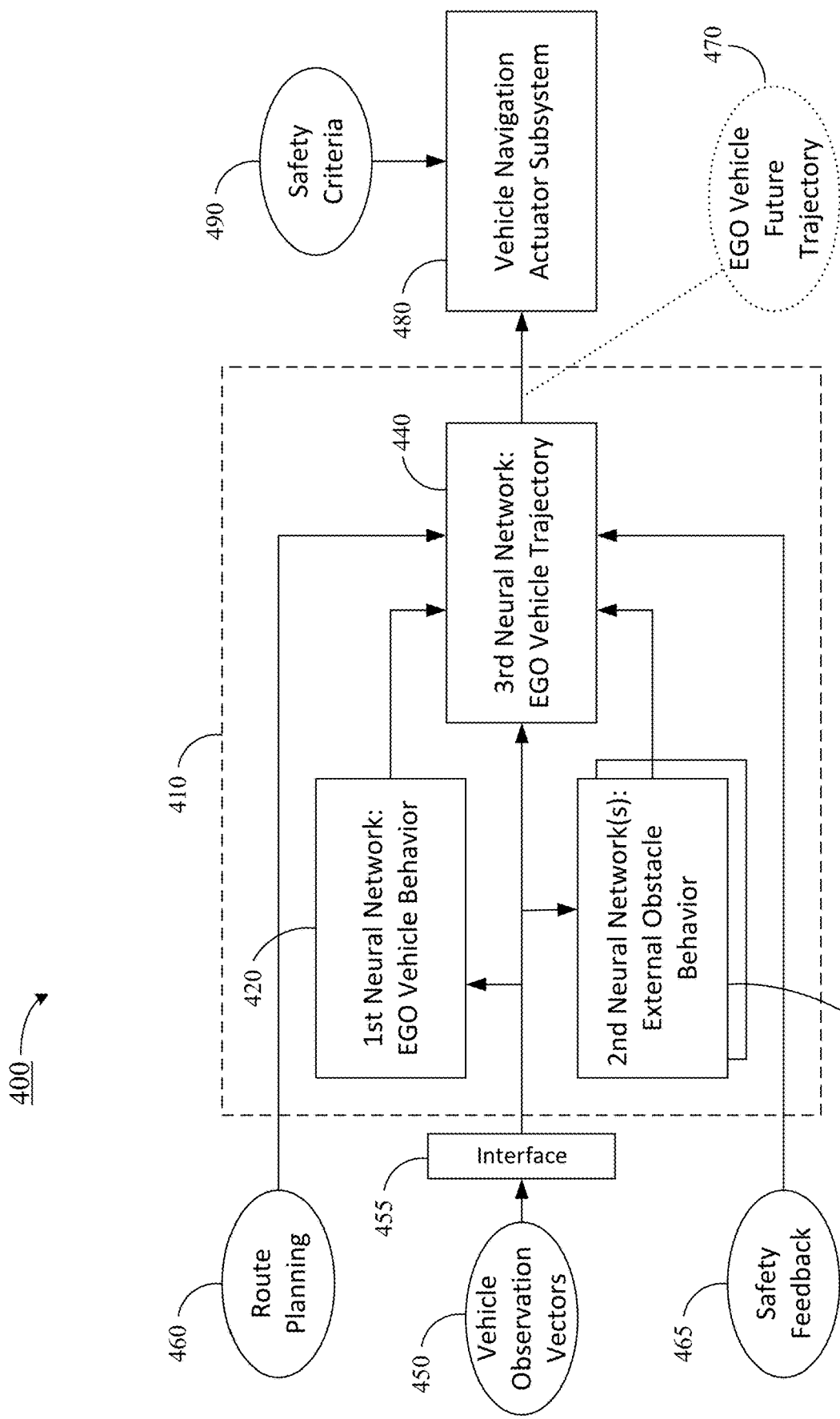
FIG. 4 is a block diagram of an example of a driving policy architecture for an autonomous vehicle system according to one or more embodiments.

FIG. 4 is a block diagram of an example of a driving policy architecture 400 for an autonomous vehicle system according to one or more embodiments, with reference to components and features described herein including but not limited to the figures and associated description. According to embodiments, the driving policy architecture 400 may be composed of multiple interconnected neural networks 410, analogous to the ecosystem of cells in the hippocampal region, to create a cognitive map. For example, such neural networks may include a first neural network 420, such as a grid network, tasked with predicting the ego-vehicle behavior; one or more second neural networks 430, such as obstacle network(s), tasked with predicting behaviors of other obstacles (such as other vehicles); and a third neural network 440, such as a place network, tasked with outputting a trajectory of the ego-vehicle based on external input as well as the excitation response from the grid and obstacle networks. To process temporal sequences, each of the three neural networks may be composed of a type of recurrent neural network unit, the long short-term memory (LSTM) network. In general terms, a long short-term memory network is a recurrent neural network that incorporates memory cell(s) to make it less sensitive to temporal delay length as compared to other sequence learning models. Each of the first neural network 420, the second neural network(s) 430, and the third neural network 440 may be implemented in a field programmable gate array (FPGA) accelerator. In some embodiments, one or more of the first neural network 420, the second neural network(s) 430, and the third neural network 440 may be implemented in an application specific integrated circuit (ASIC), or via a processor with software, or in a combination of a processor with software and a FPGA or ASIC.

The driving policy architecture 400 may receive as input vehicle observation vectors 450. The vehicle observation vectors 450 may be obtained from sensor data (such as, for example, cameras, radar, lidar, etc.), map data, and other data providing information about vehicles and other obstacles in the vicinity of the ego vehicle, and may include such other information as road geometry and local environmental conditions (e.g., weather, time-of-day, etc.). In some embodiments, the input vehicle observation vectors 450 may be obtained from a perception module (e.g., via perception module 202 and/or environmental module 204 as shown in FIG. 2, already discussed), such as a perception module as used in conjunction with RSS. In some embodiments, the input vehicle observation vectors 450 may be received via a sensor interface 455. The driving policy architecture 400 may also receive as input route planning data 460 from a route planner, and/or safety feedback (e.g., safety reward) data 465 from a safety supervisor (which may be provided via RSS).

The first neural network 420, which may be a grid network as further described with reference to FIG. 5 herein, may receive input, via the vehicle observation vectors 450, data relating to the ego vehicle. The first neural network 420 may generate predicted activations representing the future position or behavior of the ego vehicle. The second neural network 430, which may be an obstacle network as further described with reference to FIG. 6 herein, may receive input, via the vehicle observation vectors 450, data relating to existing obstacles on the road (e.g., other vehicles). The second neural network 430 may generate predicted activations representing the future positions or behaviors of those obstacles. In some embodiments, the driving policy architecture 400 may include a plurality of second neural networks 430, each of which may be an obstacle network, to handle a number of obstacles. For example, since the number of obstacles is variable, each second neural network 430 may be instantiated at runtime as may be necessary based on the input data and number of obstacles represented. The third neural network 440, which may be a place network as further described with reference to FIG. 7 herein, may receive input, via vehicle observation vectors 450, the ego vehicle behavior predictions from the first neural network 420, the obstacle behavior predictions from one or more second neural networks 430, as well as route planning data 460 and/or safety feedback data 465. The third neural network 440 may generate an ego vehicle future trajectory 470, which may represent a future planned output trajectory for the ego vehicle.

The ego vehicle future trajectory 470 resulting from the third neural network 440 may be provided as input to the vehicle navigation actuator subsystem 480, which may carry out actuation commands for controlling steering, acceleration, and/or braking functions for use in navigating and controlling the autonomous vehicle. Additionally, safety criteria input 490 from a safety module or safety supervisor may also be applied by the vehicle navigation actuator subsystem 480 in navigating and controlling the autonomous vehicle. It should be noted that, while the description herein provides specific examples of the first neural network 420, the second neural network 430 and the third neural network 440, there are many possible instantiations of the three neural networks that may be applied in the driving policy architecture 400 to carry out the features and functions as described herein.

Grid Network Architecture

Figure 5:
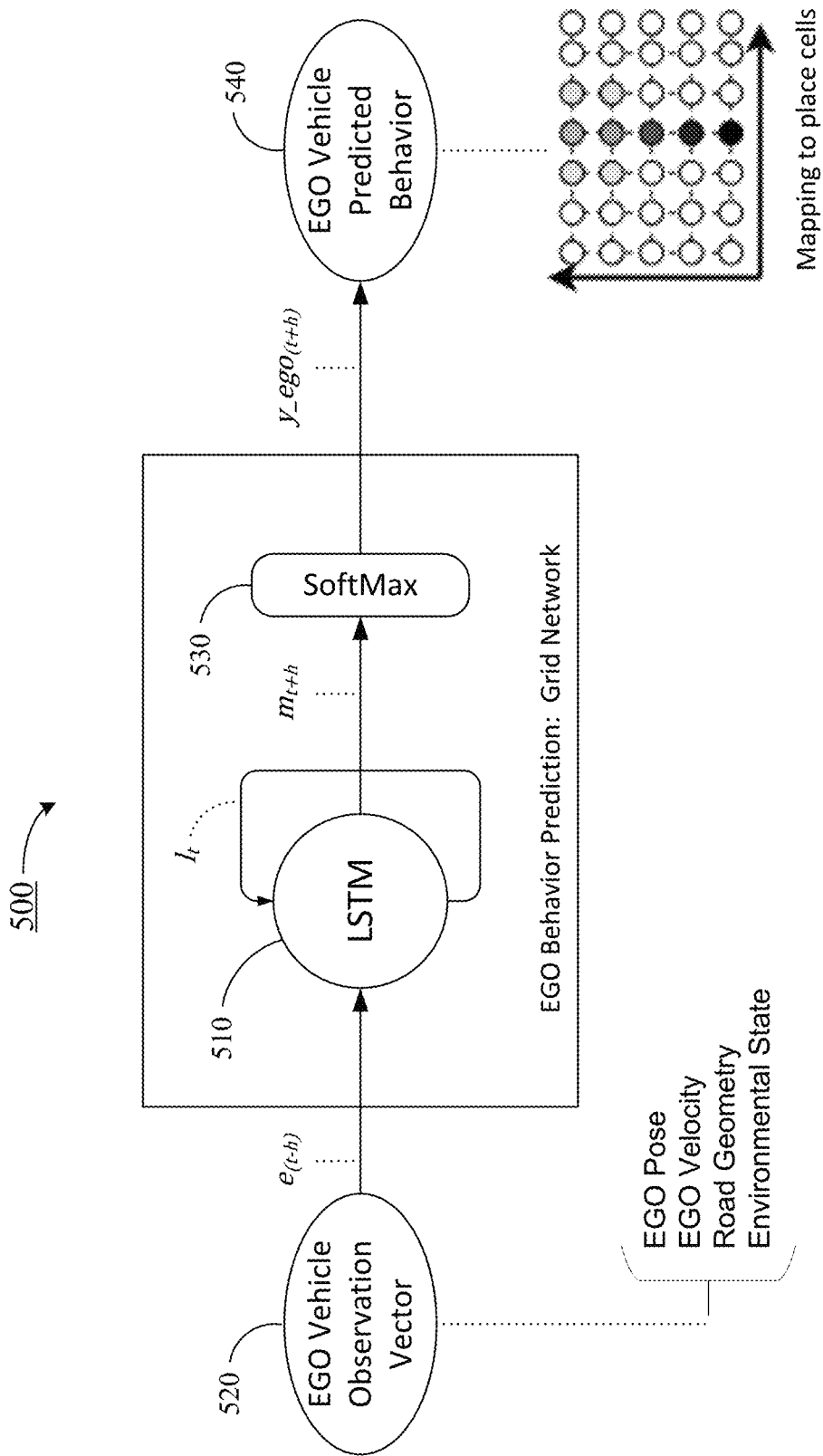
FIG. 5 is a diagram illustrating an example of a grid network for a driving policy architecture according to one or more embodiments.

FIG. 5 is a diagram illustrating an example of a grid network 500 for a driving policy architecture according to one or more embodiments, with reference to components and features described herein including but not limited to the figures and associated description. The grid network 500 may operate analogously to grid cells that are associated with predicting future occupancy spaces and may be applied to determine the behavior of the ego vehicle. The architecture for the grid network 500 may include three layers: a recurrent layer, a linear layer and an output layer. The recurrent layer may be an LSTM 510 that projects place cells excitation and may include one cell with N hidden units. As input to the layer, the ego vehicle observation vector 520 is a vector $e_{(t-h)}$ which represents the ego vehicle observations in the defined historic time horizon. The vector may be formed by the time-ordered concatenation of the ego vehicle pose (position and orientation), velocity, road geometry and environmental state:

$$e_{(t-h)} = [(e_{pose_{(t-h)}}, e_{velocity_{(t-h)}}, \text{road}_{geom_{(t-h)}}, \text{env}_{state_{(t-h)}}), \ldots, (e_{pose_{(t)}}, e_{velocity_{(t)}}, \text{road}_{geom_{(t)}}, \text{env}_{state_{(t)}})]$$

Road geometry and environmental state will generally be static within the historic time horizon. Road geometry may contain the geographical definition of lanes (drivable surfaces and boundaries) where the ego vehicle needs to drive, in a polygon representation. The environmental state may contain contextual information related to external (non-driving conditions) that might influence behavior such as illumination (day/night), weather conditions, etc., and may be provided as context for the measured pose and velocity observations. Optionally, this vector may be compressed by adding a neural network such as a variational auto encoder, such that a smaller latent vector could be passed as input to the grid network 500.

The initial cell state and hidden state of the LSTM 510 may be initialized through a linear transformation of the ground truth measurement of ego_location at time 0. The parameters of the transformations may be optimized during training by minimizing the cross entropy between the place cell predictions and the ground-truth measurements provided as input:

$$l_0 = W^{cp}e_0 + W^{cd}h_0$$

$$m_0 = W^{hp}e_0 + W^{hd}h_0$$

The output of the LSTM 510, $m_t$, may then be then passed to a SoftMax layer 530, which invokes the SoftMax function to produce predicted place cell activations $y_t$. The output, the ego vehicle predicted behavior 540, is a vector $y\_ego_{(t+h)}$ which may consist of values in the range [0-1] that represent the probability of ego vehicle place occupation. The output, thus, represents a predicted future trajectory of the ego vehicle and, as illustrated in FIG. 5, may be visualized as a set of values in a 2D grid (shown in the example grid for the ego vehicle driving in a straight trajectory).

Obstacle Network Architecture

Figure 6:
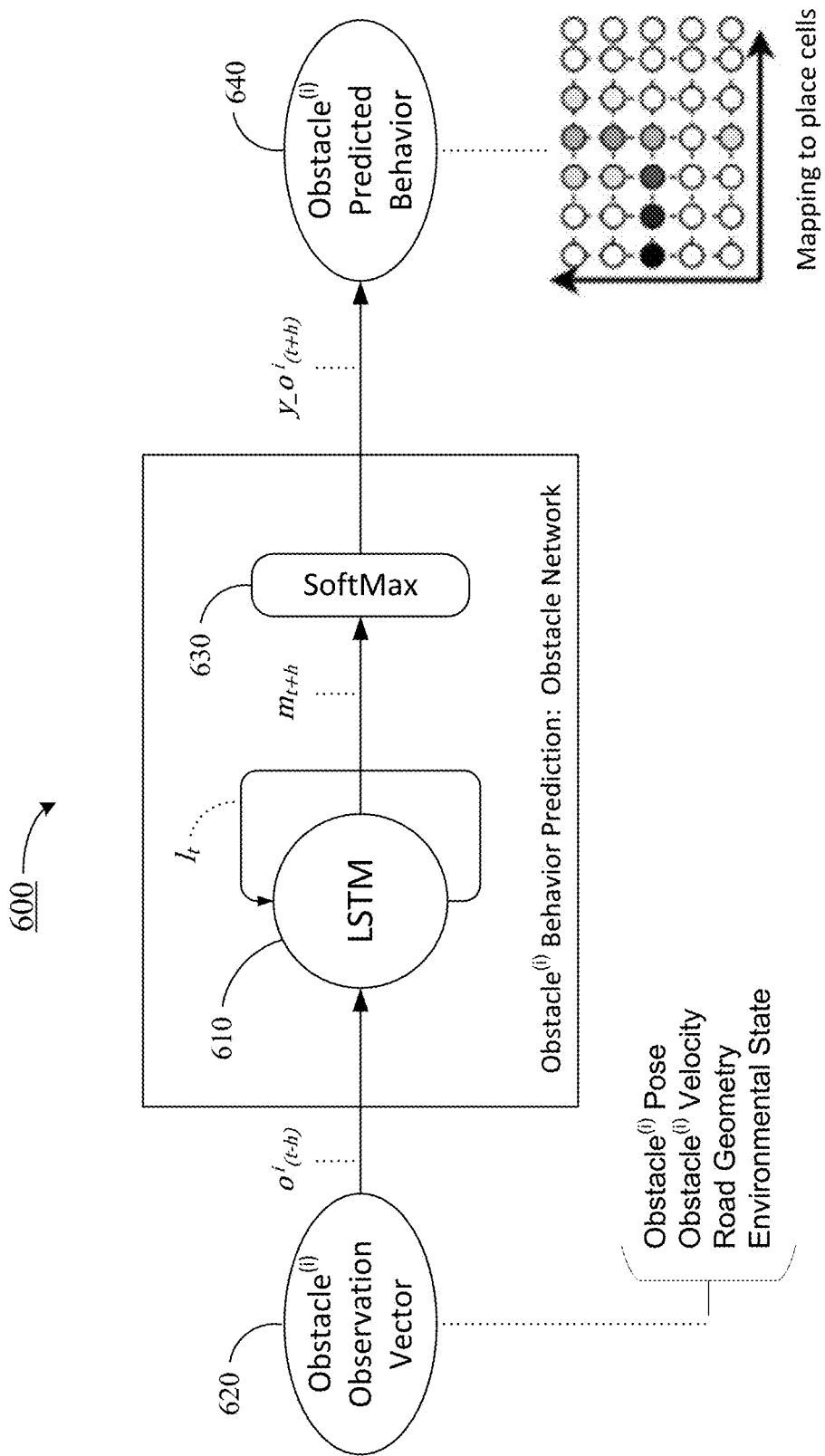
FIG. 6 is a diagram illustrating an example of an obstacle network for a driving policy architecture according to one or more embodiments.

FIG. 6 is a diagram illustrating an example of an obstacle network 600 for a driving policy architecture according to one or more embodiments, with reference to components and features described herein including but not limited to the figures and associated description. The obstacle network 600 may include the same or similar architecture as shown and described for the grid network 500 (FIG. 5), already discussed, and may operate analogously to object cells in the hippocampus that are believed to monitor objects in 3D space and predict movements. In embodiments, the obstacle network 600 may function in a manner similar to the grid network 500 in the sense that it must predict behaviors, but with a focus on other road agents, based on input information about existing obstacles (including other vehicles) on the road. Thus, for example, the obstacle network 600 may include a recurrent layer LSTM 610 that projects place cells excitation, as well as a linear layer and an output layer.

An obstacle network 600 is to focus on behavior of a single obstacle. Thus, if there are N obstacles existing in the current traffic scenario within the road segment to be analyzed, N obstacle networks 600 may be instantiated at runtime, each obstacle network 600 to focus on one of the N obstacles. As input to the obstacle network 600 for obstacle i, obstacle$^{(i)}$ observation vector 620 is a vector $o_{(t-h)}{}^i$ which represents the obstacle observations in the defined historic time horizon. This vector, similar to the input vector for the grid network 500, may be formed by the time-ordered concatenation of the obstacle pose (position and orientation), obstacle velocity, road geometry and environmental state:

$$o_{(t-h)}{}^i = [(o_{pose(t-h)}{}^i, o_{velocity(t-h)}{}^i, road_{geom(t-h)}{}^i, env_{state(t-h)}), \ldots, (o_{pose(t)}{}^i, o_{velocity(t)}{}^i, road_{geom(t)}{}^i, env_{state(t)})]$$

In a manner similar to the grid network 500, for the obstacle network 600 the output of the LSTM 610, $m_t$, may be passed to a SoftMax layer 630, which invokes the SoftMax function to produce predicted place cell activations $y_t$. The output for obstacle$^{(i)}$, the obstacle$^{(i)}$ predicted behavior 640, is a vector $y\_o_{(t+h)}{}^i$. The output, thus, represents a predicted future trajectory of the obstacle$^{(i)}$ and, as illustrated in FIG. 6, may be visualized as a set of values in a 2D grid (shown in the example grid for a vehicle moving coming from the left side of a possible intersection and performing a left turn—which could be a turn into the path of the ego vehicle depicted in FIG. 5).

Place Network Architecture

Figure 7:
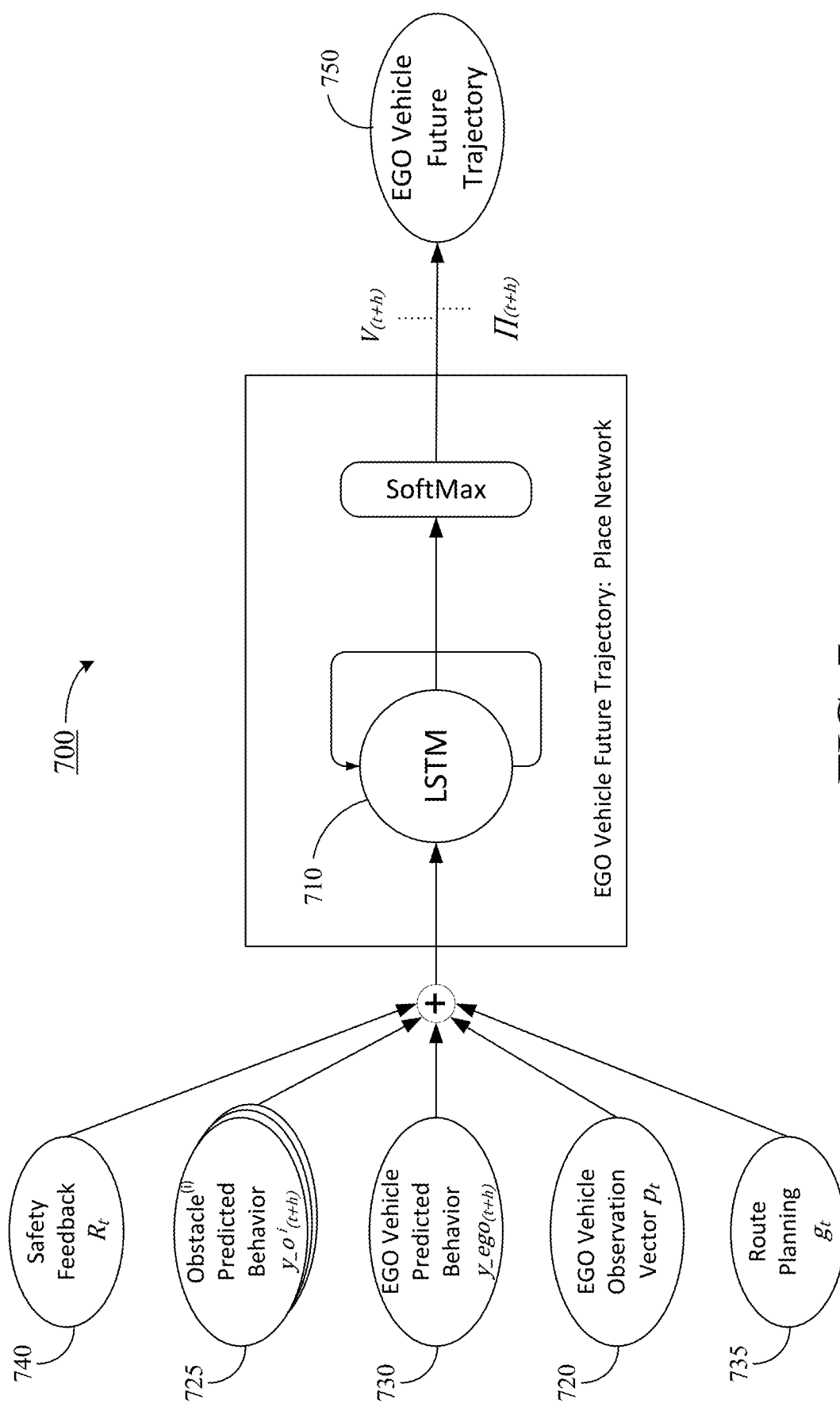
FIG. 7 is a diagram illustrating an example of a place network for a driving policy architecture according to one or more embodiments.

FIG. 7 is a diagram illustrating an example of a place network 700 for a driving policy architecture according to one or more embodiments, with reference to components and features described herein including but not limited to the figures and associated description. The place network is the last neural network of the driving policy architecture 400 in FIG. 4, already discussed (the place network is shown as the third neural network 440 in FIG. 4). The architecture for the place network 700 may include a recurrent layer, which may be an LSTM 710 and may be followed by a SoftMax layer (which invokes the SoftMax function). The place network 700 may operate to output the driving behavior for the ego vehicle as a sequence within a time horizon h, based on a set of inputs that may include (as shown in FIG. 7): the ego vehicle observation vector 720, which represents the input of the negative time horizon window; the obstacle$^{(i)}$ predicted behavior 725, which represents the predicted location of an obstacle (e.g., another vehicle) and which may be the obstacle$^{(i)}$ predicted behavior 640 in FIG. 6, already discussed (and as discussed above, if there are N obstacles existing in the current traffic scenario within the road segment to be analyzed, there would be N obstacle networks employed, resulting in N obstacle predicted behavior 725 inputs); the ego vehicle predicted behavior 730, which represents the predicted locations of the ego vehicle in the last time window and which may be the ego vehicle predicted behavior 540 in FIG. 5, already discussed; and the route planning input 735, which represents the destination goal $g_t$ provided by the vehicle routing system. In addition, the place network may receive safety feedback 740 (e.g. as a reward or safety score) from a safety supervisor or safety monitoring system (safety monitor) that monitors the previous outputted trajectory with respect to safety and driving rule conformance. Based on the inputs, the place network 700 may generate an ego vehicle future trajectory 750, which may represent a future planned output trajectory for the ego vehicle representing an action sequence (e.g., sequence of planned future behaviors).

Given all these inputs and the trajectory output, the hidden units in place network LSTM 710 should contain a representation of the actual spatial occupancy of the ego vehicle across a range of time points—i.e. operating to form a representation analogous to place cells.

The LSTM 710 of place network 700 may be architected as an LSTM Action Critic (A3C) Network. As an A3C network, the LSTM 710 may implement a policy function $\pi$ ($a_{t+h}|s_{t-h}, \theta$) (for a neural network parameterized by $\theta$) which, given a historic state from the negative time horizon to present, provides an action sequence (trajectory prediction or sequence of planned future behaviors). For purposes of training, an approximation to the value function V ($s_{t+h}, \theta$) is determined (for a neural network parameterized by $\theta$), where the value of V is the estimation of expected reward which then gets matched in the next iteration with the value given via the Safety Feedback $R_t$.

As illustrated in FIG. 7, the input to the place network 700 concatenates the output of the grid network $y\_ego_{(t+h)}$ (label 730), as well as the output of a variable number of obstacle networks, $\Sigma_{i=0}^{N} y\_o_{(t+h)}{}^i$ (if they exist) (label 725), a place vector $p_t$ that represents the current driving situation from the ego vehicle perspective (label 720), the goal location $g_t$ (label 735) provided by the route planning system, and the reward $R_t$ (label 740) given by the safety monitoring system based on the last trajectory output $a_{t-h}$. The policy loss may be expressed as:

$$\mathcal{L}_{GOP\_net} = \mathcal{L}_\pi + \alpha \mathcal{L}_V + \beta \mathcal{L}_H$$

where $\alpha$ and $\beta$ are discount coefficients, $\mathcal{L}_\pi$ is the expected loss in the time horizon, $\mathcal{L}_V$ is the reported loss from the safety monitoring system and $\mathcal{L}_H$ is a regularization term to take into account scenarios that the network has not seen before.

Generalization of Safe Driving Knowledge

It has been suggested that if networks of place cells and networks of grid cells are correctly constructed, generalization of knowledge happens automatically through vector computations in space. See Bellmund, J. L., Gärdenfors, P., Moser, E. I., & Doeller, C. F, Navigating cognition: Spatial codes for human thinking, Science, Vol. 362 No. 6415 (Nov. 9, 2018), eaat6766. Operating by analogy, embodiments of the driving policy architecture, once trained, may generalize driving knowledge to be applied to new input vectors (i.e., new scenarios) that have not been previously encountered before. For example, a new environmental input (vector) may include a different number of agents on a previously driven road, or the autonomous vehicle may be driving in a completely new environment that follows the same general rules.

The level to which driving knowledge may be generalized may be evaluated by measuring the distance between the internal representation within the network (i.e., some latent space based on the hidden units of place network 700) during training at some time t and the network activations based on newly provided input. This may be accomplished by "checkpointing" the latent space of the LSTM 710 at certain time, creating a snapshot of the learned knowledge. Then, after new input is provided, a check may be performed of the difference of this vector against the newly formed latent space resulting from the new input. If there is no difference between them, or if the difference is smaller than a certain threshold, it may be concluded that the internal knowledge of the driving policy architecture already contains the input (e.g., the new input is "not surprising" to the architecture).

Generalization Against New Road Networks

Embodiments provide the capability of competently navigating in new environments without the need for retraining. By providing the essential preprocessed information over a short time horizon, there is no need for the driving policy to learn complete world maps and how to navigate them. A subset of finite tasks provided to the driving policy architecture may be employed for training purposes sufficient for the driving policy to learn a finite set of road geometries and situations which may then become generalized knowledge within the driving policy architecture, permitting the driving policy to effectively navigate against real world variations such as novel road curvatures or novel multilane networks or complex intersections.

Figure 8:
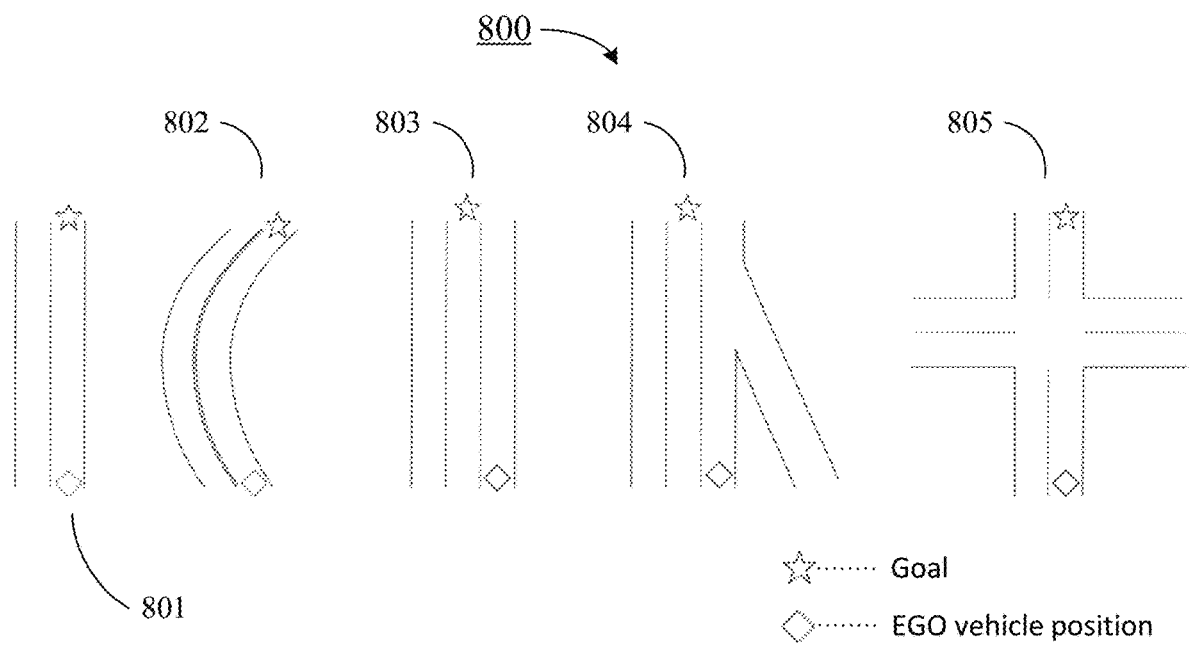
FIG. 8 is a diagram illustrating an example of a subset of finite tasks provided to the driving policy architecture according to one or more embodiments.

FIG. 8 provides a diagram 800 illustrating an example of a subset of finite tasks that may be provided to the driving policy architecture according to one or more embodiments, with reference to components and features described herein including but not limited to the figures and associated description. Shown in FIG. 8 are several examples of portions of a road network to be traversed by the ego vehicle, where diamonds represent ego-vehicle position and stars represent the goal for the horizon window. The illustrated training tasks may include, for example, straight two-lane road segment 801, curved two-lane road segment 802, straight multi-lane road segment 803, multi-lane road segment 804 with access lane (e.g., on-ramp), and intersection 805 between a pair of two-lane road segments. Embodiments may be trained so that the ego vehicle travels on each road segment safely and within proper lanes.

Generalization Against Unsafe or Unforeseen Obstacle Behaviors

In embodiments, during training of the driving policy architecture the number of existing obstacles in the road may be abstracted with individual behavior predictions provided by the obstacle network. During runtime, new or unsafe behaviors may be encountered that were not observed during the training phase, such as, for example, aggressive cut-ins or road violations. Embodiments may incorporate input such as safety feedback or reward from a safety supervisor (e.g., safety feedback 465 in FIG. 4, already discussed) to calculate minimum distance safety metrics that are incorporated during training and applied as safety guarantees on the generated ego vehicle trajectory to avoid the errant obstacle, as long as the behavior is supported by the foreseeable assumptions embedded in the safety supervisor.

Figure 9:
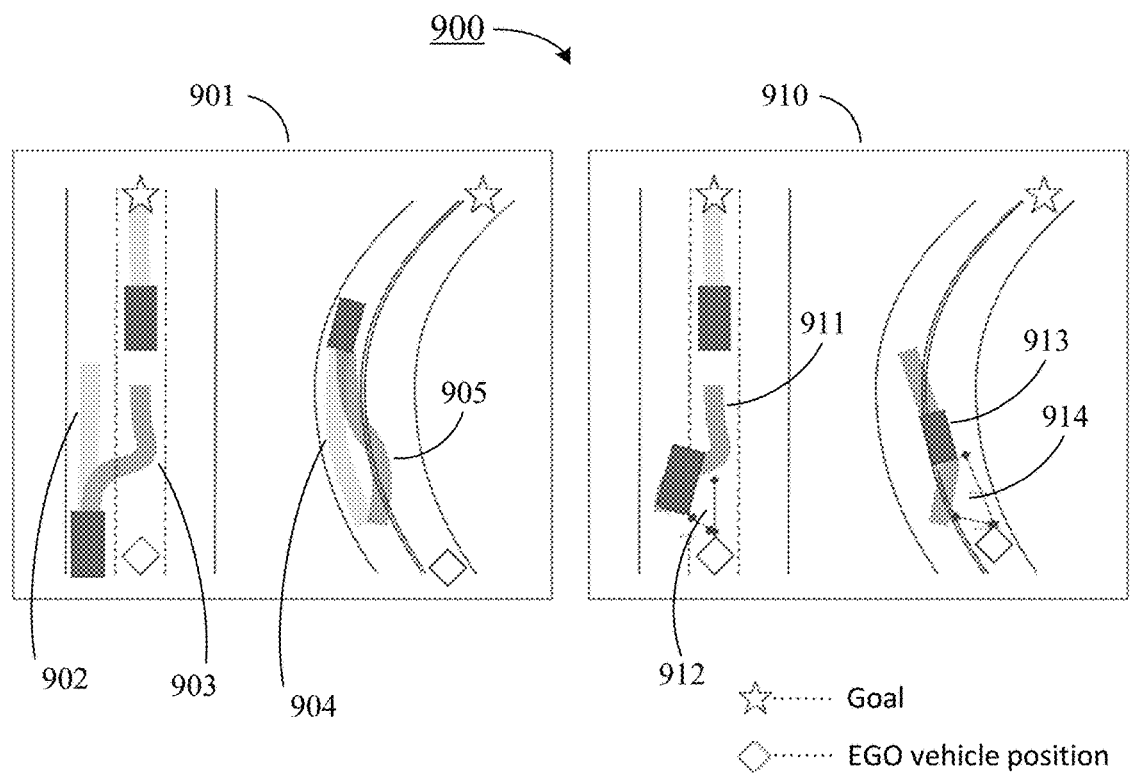
FIG. 9 is a diagram illustrating examples of unforeseen obstacle behaviors and the system response according to one or more embodiments.

FIG. 9 is a diagram 900 illustrating examples of unforeseen obstacle behaviors that may be encountered and the system response according to one or more embodiments, with reference to components and features described herein including but not limited to the figures and associated description. Shown in FIG. 9 are examples of portions of a road network to be traversed by the ego vehicle, where diamonds represent ego-vehicle position and stars represent the goal for the horizon window. In frame 901, two scenarios are illustrated at time to. In the left example, the ego vehicle is on a straight multi-lane road segment with other vehicles. A predicted path 902 for the nearest vehicle is computed, but in real-world behavior the vehicle may deviate to the path 903, creating a potential hazard for the ego vehicle. In the right example of frame 901, the ego vehicle is on a curved two-lane road segment with another nearby vehicle. A predicted path 904 for the nearby vehicle is computed, but in real-world behavior the vehicle may deviate to the path 905, creating another potential hazard for the ego vehicle.

In frame 910, the same two scenarios are illustrated at time ti. In the left example, the nearest vehicle on the path 911 has begun moving into the lane occupied by the ego vehicle. The system may determine longitudinal and lateral distances 912 between the ego vehicle and the errant vehicle in the path 911 and apply appropriate commands, e.g. steering or braking, to maintain the ego vehicle at minimum safe distances from the errant vehicle. In the right example, the nearby vehicle on the path 913 has crossed into the lane occupied by the ego vehicle. The system may determine longitudinal and lateral distances 914 between the ego vehicle and the errant vehicle in the path 913 and apply appropriate commands, e.g. steering or braking, to maintain the ego vehicle at minimum safe distances from the errant vehicle.

Figure 10A:
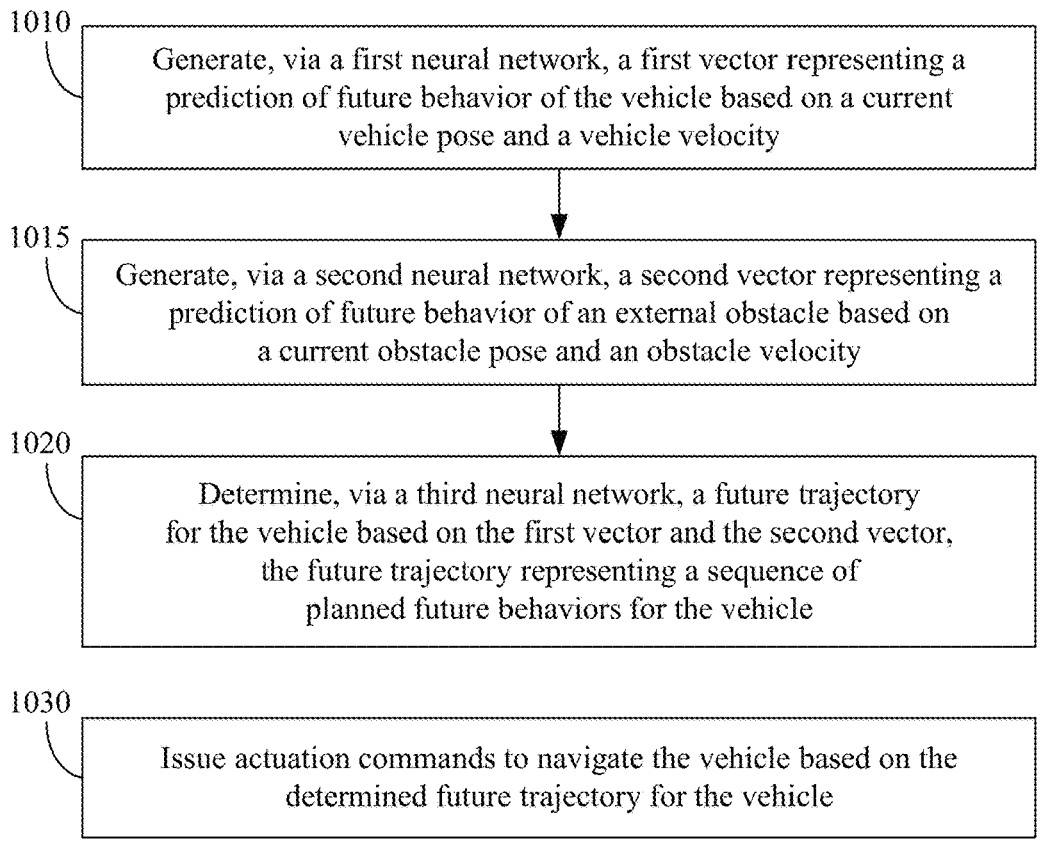
FIGS. 10A-10C provide flowcharts illustrating operation of an example of a driving policy architecture for an autonomous vehicle according to one or more embodiments.
Figure 10B:
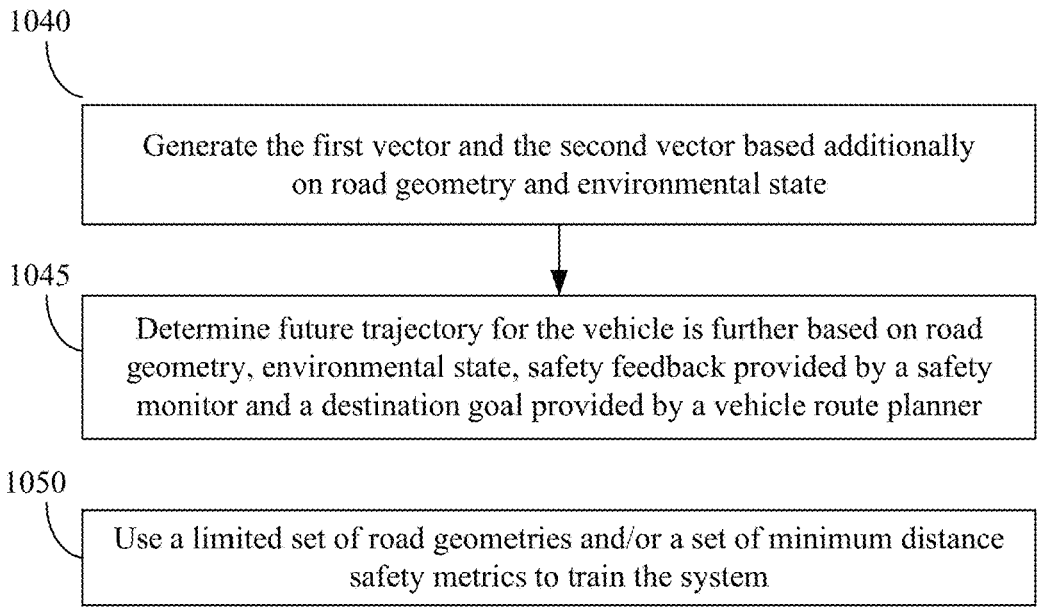
Figure 10C:
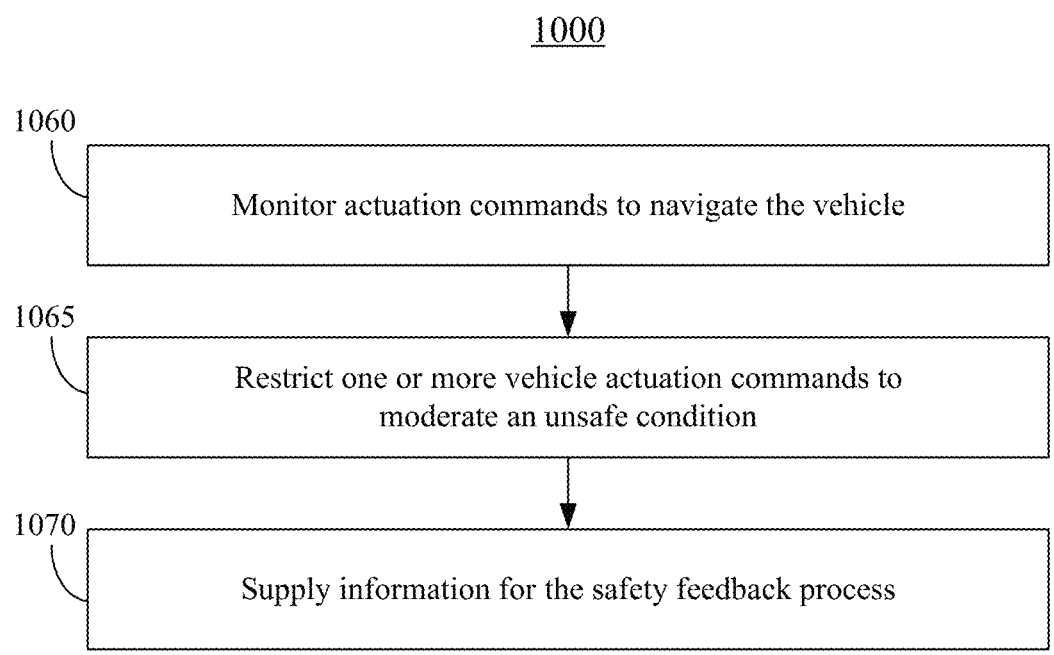

FIGS. 10A-10C provide flowcharts illustrating a process 1000 for operating an example of a driving policy architecture for an autonomous vehicle according to one or more embodiments, with reference to components and features described herein including but not limited to the figures and associated description. The process 1000 may be implemented in the driving policy architecture 400 described herein with reference to FIG. 4, already discussed. More particularly, the process 1000 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in process 1000 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning to FIG. 10A, illustrated processing block 1010 provides for generating, via a first neural network, a first vector representing a prediction of future behavior of the vehicle based on a current vehicle pose and a vehicle velocity. The first neural network may include the first neural network 420 (FIG. 4), already discussed, or the grid network 500 (FIG. 5), already discussed. The vehicle pose may include the current position of the vehicle and/or the current orientation of the vehicle.

Illustrated processing block 1015 provides for generating, via a second neural network, a second vector representing a prediction of future behavior of an external obstacle based on a current obstacle pose and an obstacle velocity. The second neural network may include the second neural network 430 (FIG. 4), already discussed, or the obstacle network 600 (FIG. 6), already discussed. The obstacle pose may include the current position of the obstacle and/or the current orientation of the obstacle. The obstacle may be another vehicle.

Illustrated processing block 1020 provides for determining, via a third neural network, a future trajectory for the vehicle based on the first vector and the second vector, the future trajectory representing a sequence of planned future behaviors for the vehicle. The third neural network may include the third neural network 440 (FIG. 4), already discussed, or the place network 700 (FIG. 7), already discussed. The future trajectory may include the ego vehicle future trajectory 470 (FIG. 4), already discussed, or the ego vehicle future trajectory 750 (FIG. 7), already discussed.

Illustrated processing block 1030 provides for issuing actuation commands to navigate the autonomous vehicle based on the determined future trajectory for the vehicle. Actuation commands may include one or more commands to steer, apply braking, or apply acceleration.

Turning now to FIG. 10B, illustrated processing block 1040 provides for generating the first vector (block 1010) and generating the second vector (block 1015) based additionally on road geometry and environmental state. The road geometry may include geographical definition of lanes such as, e.g., drivable surfaces and boundaries where the ego vehicle needs to drive. The environmental state may include local environmental conditions, such as, e.g., weather, time-of-day, etc. Illustrated processing block 1045 provides for determining the future trajectory for the vehicle further based on road geometry, environmental state, safety feedback provided by a safety monitor and a destination goal provided by a vehicle route planner.

Illustrated processing block 1050 provides for using a limited set of road geometries and/or a set of minimum distance safety metrics to train the system. Such training may be performed on the first neural network, the second neural network and the third network, and these neural networks may be trained together as a unit. The limited road geometries for training may include portions of a road network such as, for example, a straight two-lane road segment, a curved two-lane road segment, a straight multi-lane road segment, a multi-lane road segment with access lane (e.g., on-ramp), and/or an intersection between a pair of two-lane road segments, as illustrated with reference to FIG. 8, already discussed.

Turning now to FIG. 10C, illustrated processing block 1060 provides for monitoring actuation commands to navigate the autonomous vehicle. Monitoring actuation commands may be performed by, e.g., a safety supervisor or safety monitoring system that monitors the previous outputted ego vehicle trajectory. The safety supervisor or safety monitoring system may be in communication with, or integrated with, the driving policy architecture. Illustrated processing block 1065 provides for restricting one or more vehicle actuation commands to moderate an unsafe condition. Illustrated processing block 1070 provides for supplying information for the safety feedback process.

Figure 11:
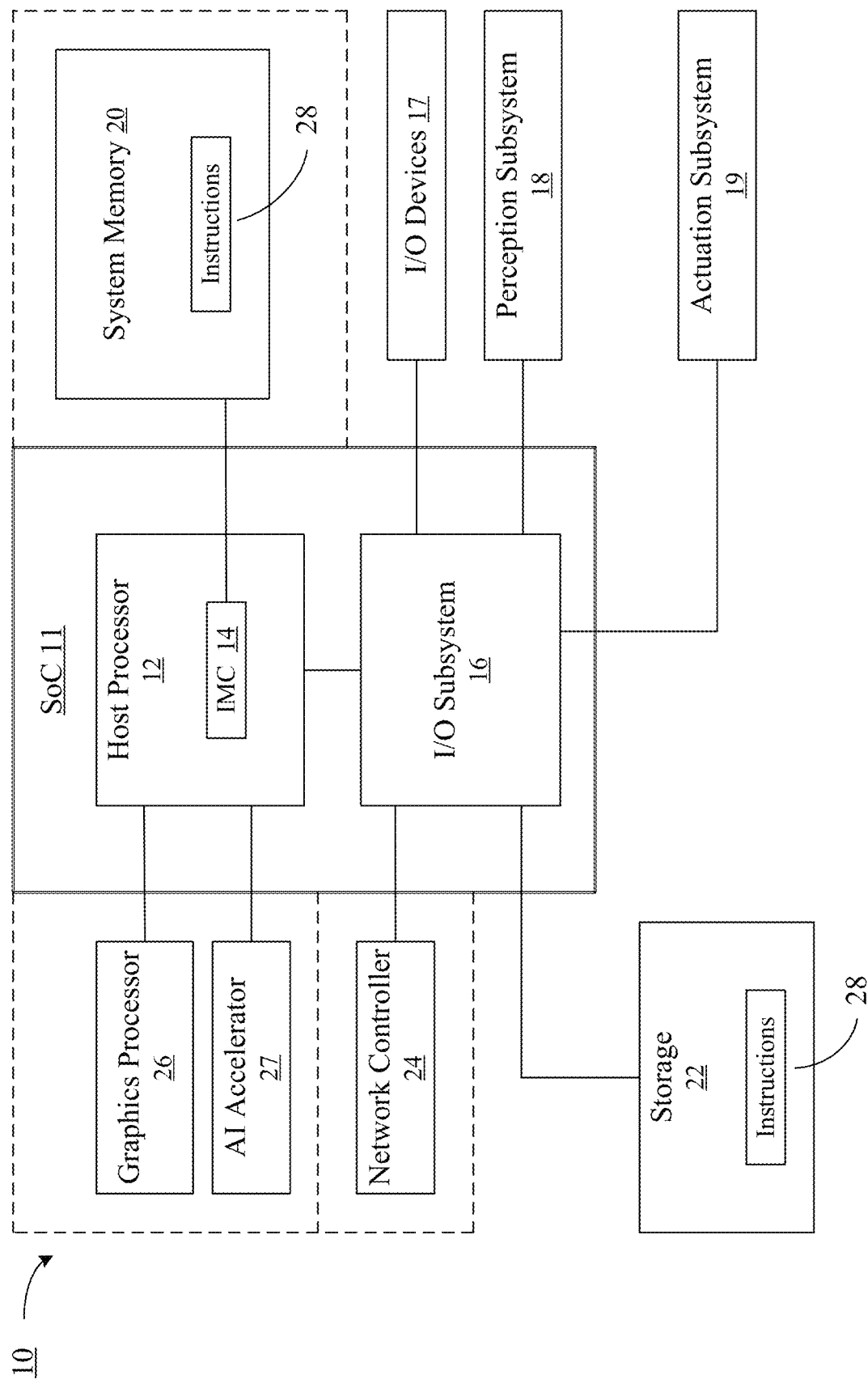
FIG. 11 is a block diagram illustrating an example of a performance-enhanced computing system according to one or more embodiments.

FIG. 11 shows a block diagram illustrating an example computing system 10 for encoding safe driving knowledge into cognitive spaces for automated vehicle navigation according to one or more embodiments, with reference to components and features described herein including but not limited to the figures and associated description. The system 10 may generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 may include a host processor 12 (e.g., central processing unit/CPU) having an integrated memory controller (IMC) 14 that may be coupled to system memory 20. The host processor 12 may include any type of processing device, such as, e.g., microcontroller, microprocessor, RISC processor, ASIC, etc., along with associated processing modules or circuitry. The system memory 20 may include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 may also include an input/output (I/O) subsystem 16. The I/O subsystem 16 may communicate with for example, one or more input/output (I/O) devices 17, a network controller 24 (e.g., wired and/or wireless NIC), and storage 22. The storage 22 may be comprised of any appropriate non-transitory machine- or computer-readable memory type (e.g., flash memory, DRAM, SRAM (static random access memory), solid state drive (SSD), hard disk drive (HDD), optical disk, etc.). The storage 22 may include mass storage. In some embodiments, the host processor 12 and/or the I/O subsystem 16 may communicate with the storage 22 (all or portions thereof) via the network controller 24. In some embodiments, the system 10 may also include a graphics processor 26 (e.g., graphics processing unit/GPU) and an AI accelerator 27. In some embodiments, the system 10 may also include a perception subsystem 18 (e.g., including one or more sensors and/or cameras) and/or an actuation subsystem 19. In an embodiment, the system 10 may also include a vision processing unit (VPU), not shown.

The host processor 12 and the I/O subsystem 16 may be implemented together on a semiconductor die as a system on chip (SoC) 11, shown encased in a solid line. The SoC 11 may therefore operate as a computing apparatus for autonomous vehicle control. In some embodiments, the SoC 11 may also include one or more of the system memory 20, the network controller 24, the graphics processor 26 and/or the AI accelerator 27 (shown encased in dotted lines). In some embodiments, the SoC 11 may also include other components of the system 10.

The host processor 12, the I/O subsystem 16, the graphics processor 26, the AI accelerator 27 and/or the VPU may execute program instructions 28 retrieved from the system memory 20 and/or the storage 22 to perform one or more aspects of the process 1000 as described herein with reference to FIGS. 10A-10C. Thus, execution of instructions 28 may cause the SoC 11 to generate, via a first neural network, a first vector representing a prediction of future behavior of the vehicle based on a current vehicle position and a vehicle velocity, generate, via a second neural network, a second vector representing a prediction of future behavior of an external obstacle based on a current obstacle position and an obstacle velocity, and determine, via a third neural network, a future trajectory for the vehicle based on the first vector and the second vector, the future trajectory representing a sequence of planned future behaviors for the vehicle. The system 10 may implement one or more aspects of the autonomous vehicle system 200, the driving policy architecture 400, the grid network 500, the obstacle network 600 and/or the place network 700 as described herein with reference to FIGS. 2-7. The system 10 is therefore considered to be performance-enhanced at least to the extent that driving experiences may be generalized by encoding safe driving knowledge into cognitive spaces.

Computer program code to carry out the processes described above may be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

The I/O devices 17 may include one or more of input devices, such as a touch-screen, keyboard, mouse, cursor-control device, touch-screen, microphone, digital camera, video recorder, camcorder, biometric scanners and/or sensors; input devices may be used to enter information and interact with the system 10 and/or with other devices. The I/O devices 17 may also include one or more of output devices, such as a display (e.g., touch screen, liquid crystal display/LCD, light emitting diode/LED display, plasma panels, etc.), speakers and/or other visual or audio output devices. The input and/or output devices may be used, e.g., to provide a user interface.

Figure 12:
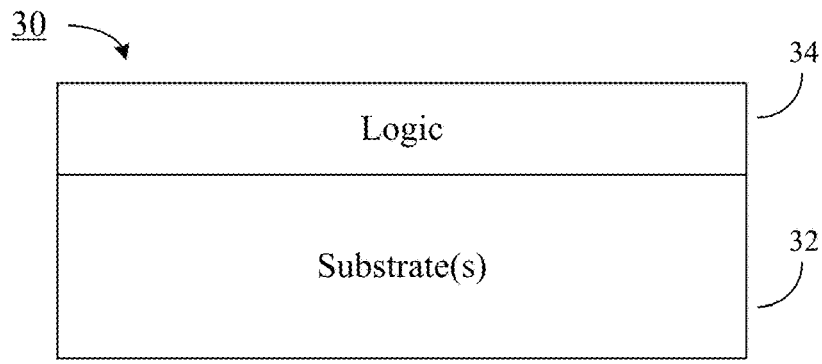
FIG. 12 is a block diagram illustrating an example semiconductor apparatus according to one or more embodiments.

FIG. 12 shows a block diagram illustrating an example semiconductor apparatus 30 for encoding safe driving knowledge into cognitive spaces for automated vehicle navigation according to one or more embodiments, with reference to components and features described herein including but not limited to the figures and associated description. The semiconductor apparatus 30 may be implemented, e.g., as a chip, die, or other semiconductor package. The semiconductor apparatus 30 may include one or more substrates 32 comprised of, e.g., silicon, sapphire, gallium arsenide, etc. The semiconductor apparatus 30 may also include logic 34 comprised of, e.g., transistor array(s) and other integrated circuit (IC) components) coupled to the substrate(s) 32. The logic 34 may be implemented at least partly in configurable logic or fixed-functionality logic hardware. The logic 34 may implement the system on chip (SoC) 11 described above with reference to FIG. 11. The logic 34 may implement one or more aspects of the processes described above, including the process 1000 to generate, via a first neural network, a first vector representing a prediction of future behavior of the vehicle based on a current vehicle position and a vehicle velocity, generate, via a second neural network, a second vector representing a prediction of future behavior of an external obstacle based on a current obstacle position and an obstacle velocity, and determine, via a third neural network, a future trajectory for the vehicle based on the first vector and the second vector, the future trajectory representing a sequence of planned future behaviors for the vehicle, as described herein with reference to FIGS. 10A-10C. The logic 34 may implement one or more aspects of the autonomous vehicle system 200, the driving policy architecture 400, the grid network 500, the obstacle network 600, and/or the place network 700 as described herein with reference to FIGS. 2-7. The apparatus 30 is therefore considered to be performance-enhanced at least to the extent that driving experiences may be generalized by encoding safe driving knowledge into cognitive spaces.

The semiconductor apparatus 30 may be constructed using any appropriate semiconductor manufacturing processes or techniques. For example, the logic 34 may include transistor channel regions that are positioned (e.g., embedded) within the substrate(s) 32. Thus, the interface between the logic 34 and the substrate(s) 32 may not be an abrupt junction. The logic 34 may also be considered to include an epitaxial layer that is grown on an initial wafer of the substrate(s) 34.

Figure 13:
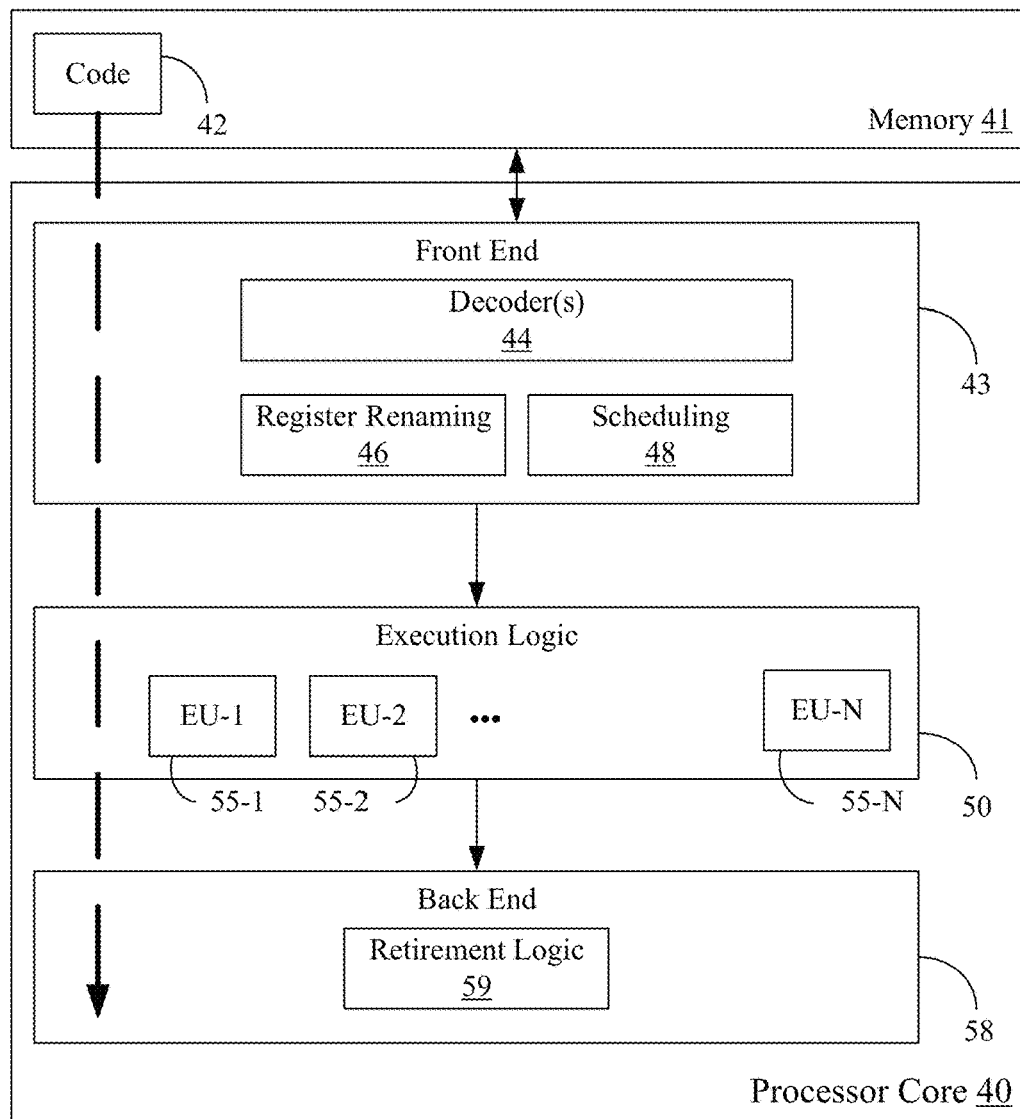
FIG. 13 is a block diagram illustrating an example of a processor according to one or more embodiments.

FIG. 13 is a block diagram illustrating an example processor core 40 according to one or more embodiments, with reference to components and features described herein including but not limited to the figures and associated description. The processor core 40 may be the core for any type of processor, such as a micro-processor, an embedded processor, a digital signal processor (DSP), a network processor, or other device to execute code. Although only one processor core 40 is illustrated in FIG. 13, a processing element may alternatively include more than one of the processor core 40 illustrated in FIG. 13. The processor core 40 may be a single-threaded core or, for at least one embodiment, the processor core 40 may be multithreaded in that it may include more than one hardware thread context (or "logical processor") per core.

FIG. 13 also illustrates a memory 41 coupled to the processor core 40. The memory 41 may be any of a wide variety of memories (including various layers of memory hierarchy) as are known or otherwise available to those of skill in the art. The memory 41 may include one or more code 42 instruction(s) to be executed by the processor core 40. The code 42 may implement one or more aspects of the process 1000 as described herein with reference to FIGS. 10A-10C. The processor core 40 may implement one or more aspects of the autonomous vehicle system 200, the driving policy architecture 400, the grid network 500, the obstacle network 600 and/or the place network 700 as described herein with reference to FIGS. 2-7. The processor core 40 follows a program sequence of instructions indicated by the code 42. Each instruction may enter a front end portion 43 and be processed by one or more decoders 44. The decoder 44 may generate as its output a micro operation such as a fixed width micro operation in a predefined format, or may generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments may include a number of execution units dedicated to specific functions or sets of functions. Other embodiments may include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 may take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 13, a processing element may include other elements on chip with the processor core 40. For example, a processing element may include memory control logic along with the processor core 40. The processing element may include I/O control logic and/or may include I/O control logic integrated with memory control logic. The processing element may also include one or more caches.

Figure 14:
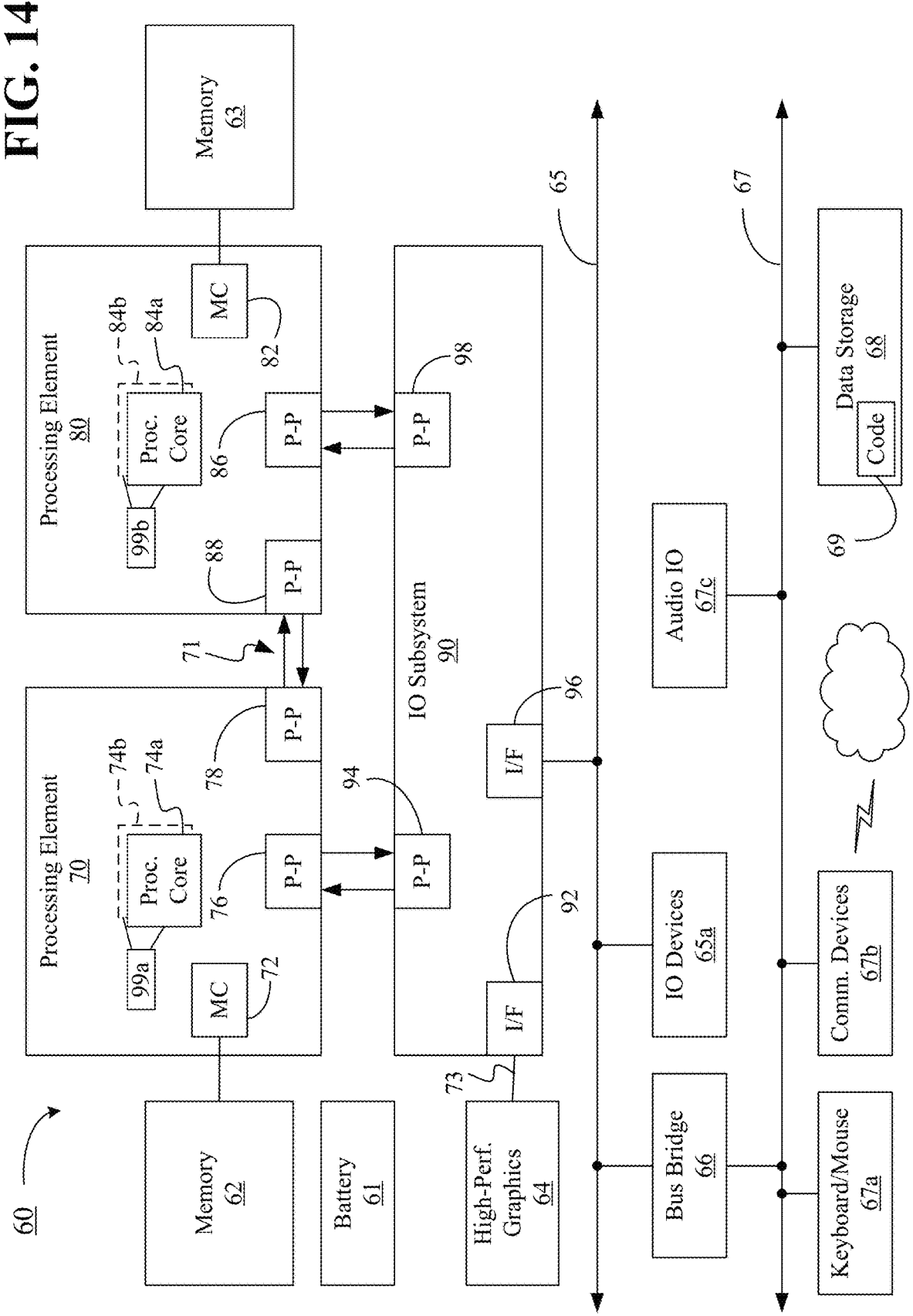
FIG. 14 is a block diagram illustrating an example of a multiprocessor-based computing system according to one or more embodiments.

FIG. 14 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 may also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 14 may be implemented as a multi-drop bus rather than point-to-point interconnect.

As shown in FIG. 14, each of processing elements 70 and 80 may be multicore processors, including first and second processor cores (i.e., processor cores 74a and 74b and processor cores 84a and 84b). Such cores 74a, 74b, 84a, 84b may be configured to execute instruction code in a manner similar to that discussed above in connection with FIG. 13.

Each processing element 70, 80 may include at least one shared cache 99a, 99b. The shared cache 99a, 99b may store data (e.g., instructions) that are utilized by one or more components of the processor, such as the cores 74a, 74b and 84a, 84b, respectively. For example, the shared cache 99a, 99b may locally cache data stored in a memory 62, 63 for faster access by components of the processor. In one or more embodiments, the shared cache 99a, 99b may include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments are not so limited. In other embodiments, one or more additional processing elements may be present in a given processor. Alternatively, one or more of processing elements 70, 80 may be an element other than a processor, such as an accelerator or a field programmable gate array. For example, additional processing element(s) may include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences may effectively manifest themselves as asymmetry and heterogeneity amongst the processing elements 70, 80. For at least one embodiment, the various processing elements 70, 80 may reside in the same die package.

The first processing element 70 may further include memory controller logic (MC) 72 and point-to-point (P-P) interfaces 76 and 78. Similarly, the second processing element 80 may include a MC 82 and P-P interfaces 86 and 88. As shown in FIG. 14, MC's 72 and 82 couple the processors to respective memories, namely a memory 62 and a memory 63, which may be portions of main memory locally attached to the respective processors. While the MC 72 and 82 is illustrated as integrated into the processing elements 70, 80, for alternative embodiments the MC logic may be discrete logic outside the processing elements 70, 80 rather than integrated therein.

The first processing element 70 and the second processing element 80 may be coupled to an I/O subsystem 90 via P-P interconnects 76 and 86, respectively. As shown in FIG. 14, the I/O subsystem 90 includes P-P interfaces 94 and 98. Furthermore, the I/O subsystem 90 includes an interface 92 to couple the I/O subsystem 90 with a high performance graphics engine 64. In one embodiment, a bus 73 may be used to couple the graphics engine 64 to the I/O subsystem 90. Alternately, a point-to-point interconnect may couple these components.

In turn, the I/O subsystem 90 may be coupled to a first bus 65 via an interface 96. In one embodiment, the first bus 65 may be a Peripheral Component Interconnect (PCI) bus, or a bus such as a PCI Express bus or another third generation I/O interconnect bus, although the scope of the embodiments are not so limited.

As shown in FIG. 14, various I/O devices 65a (e.g., biometric scanners, speakers, cameras, sensors) may be coupled to the first bus 65, along with a bus bridge 66 which may couple the first bus 65 to a second bus 67. In one embodiment, the second bus 67 may be a low pin count (LPC) bus. Various devices may be coupled to the second bus 67 including, for example, a keyboard/mouse 67a, communication device(s) 67b, and a data storage unit 68 such as a disk drive or other mass storage device which may include code 69, in one embodiment. The illustrated code 69 may implement one or more aspects of the processes described above, including the process 1000 as described herein with reference to FIGS. 10A-10C. The illustrated code 69 may be similar to the code 42 (FIG. 13), already discussed. Further, an audio I/O 67c may be coupled to second bus 67 and a battery 61 may supply power to the computing system 60. The system 60 may implement one or more aspects of the autonomous vehicle system 200, the driving policy architecture 400, the grid network 500, the obstacle network 600, and/or the place network 700, as described herein with reference to FIGS. 2-7.

Note that other embodiments are contemplated. For example, instead of the point-to-point architecture of FIG. 14, a system may implement a multi-drop bus or another such communication topology. Also, the elements of FIG. 14 may alternatively be partitioned using more or fewer integrated chips than shown in FIG. 14.

Embodiments of each of the above systems, devices, components and/or methods, including the system 10, the semiconductor apparatus 30, the processor core 40, the system 60, the autonomous vehicle system 200, the driving policy architecture 400, the grid network 500, the obstacle network 600, the place network 700, and/or any other system components, may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example 1 includes a vehicle computing system comprising a sensor interface to obtain data for a vehicle and data for one or more external obstacles, and a processor coupled to the sensor interface, the processor including one or more substrates and logic coupled to the one or more substrates, wherein the logic is implemented at least partly in one or more of configurable logic or fixed-functionality hardware logic, the logic coupled to the one or more substrates to generate, via a first neural network, a first vector representing a prediction of future behavior of the vehicle based on a current vehicle position and a vehicle velocity, generate, via a second neural network, a second vector representing a prediction of future behavior of an external obstacle based on a current obstacle position and an obstacle velocity, and determine, via a third neural network, a future trajectory for the vehicle based on the first vector and the second vector, the future trajectory representing a sequence of planned future behaviors for the vehicle.

Example 2 includes the system of Example 1, wherein the first neural network comprises a long short-term (LSTM) network that is to produce predicted place cell activations for the vehicle and the first vector represents a probability of vehicle place occupation, wherein the second neural network comprises a LSTM network that is to produce predicted place cell activations for the external obstacle and the second vector represents a probability of obstacle place occupation, and wherein the third neural network comprises a LSTM network that is to produce a future action sequence for the vehicle.

Example 3 includes the system of Example 2, wherein to generate the first vector is further based on a road geometry and an environmental state, wherein to generate the second vector is further based on the road geometry and the environmental state, and wherein to determine the future trajectory for the vehicle is further based on the road geometry, the environmental state, a safety feedback provided by a safety monitor and a destination goal provided by a vehicle route planner.

Example 4 includes the system of Example 3, wherein the logic is further to issue actuation commands to navigate the vehicle based on the future trajectory for the vehicle.

Example 5 includes the system of Example 4, wherein the logic further comprises a safety component to monitor the actuation commands to navigate the vehicle, restrict one or more of the actuation commands to moderate an unsafe condition, and provide information for the safety feedback.

Example 6 includes the system of any of Examples 1-5, wherein one or more of a limited set of road geometries or a set of minimum distance safety metrics is used to train the system.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate, via a first neural network, a first vector representing a prediction of future behavior of a vehicle based on a current vehicle position and a vehicle velocity, generate, via a second neural network, a second vector representing a prediction of future behavior of an external obstacle based on a current obstacle position and an obstacle velocity, and determine, via a third neural network, a future trajectory for the vehicle based on the first vector and the second vector, the future trajectory representing a sequence of planned future behaviors for the vehicle.

Example 8 includes the semiconductor apparatus of Example 7, wherein the first neural network comprises a long short-term (LSTM) network that is to produce predicted place cell activations for the vehicle and the first vector represents a probability of vehicle place occupation, wherein the second neural network comprises a LSTM network that is to produce predicted place cell activations for the external obstacle and the second vector represents a probability of obstacle place occupation, and wherein the third neural network comprises a LSTM network that is to produce a future action sequence for the vehicle.

Example 9 includes the semiconductor apparatus of Example 8, wherein to generate the first vector is further based on a road geometry and an environmental state, wherein to generate the second vector is further based on the road geometry and the environmental state, and wherein to determine the future trajectory for the vehicle is further based on the road geometry, the environmental state, a safety feedback provided by a safety monitor and a destination goal provided by a vehicle route planner.

Example 10 includes the semiconductor apparatus of Example 9, wherein the logic is further to issue actuation commands to navigate the vehicle based on the future trajectory for the vehicle.

Example 11 includes the semiconductor apparatus of Example 10, wherein the logic further comprises a safety component to monitor the actuation commands to navigate the vehicle, restrict one or more of the actuation commands to moderate an unsafe condition, and provide information for the safety feedback.

Example 12 includes the semiconductor apparatus of any of Examples 7-11, wherein one or more of a limited set of road geometries or a set of minimum distance safety metrics is used to train the first neural network, the second neural network, and the third neural network together as a unit.

Example 13 includes the semiconductor apparatus of Example 7, wherein the logic coupled to the one or more substrates includes transistor channel regions that are positioned within the one or more substrates.

Example 14 includes at least one non-transitory computer readable storage medium comprising a set of instructions which, when executed by a computing system, cause the computing system to generate, via a first neural network, a first vector representing a prediction of future behavior of a vehicle based on a current vehicle position and a vehicle velocity, generate, via a second neural network, a second vector representing a prediction of future behavior of an external obstacle based on a current obstacle position and an obstacle velocity, and determine, via a third neural network, a future trajectory for the vehicle based on the first vector and the second vector, the future trajectory representing a sequence of planned future behaviors for the vehicle.

Example 15 includes the at least one non-transitory computer readable storage medium of Example 14, wherein the first neural network comprises a long short-term (LSTM) network that is to produce predicted place cell activations for the vehicle and the first vector represents a probability of vehicle place occupation, wherein the second neural network comprises a LSTM network that is to produce predicted place cell activations for the external obstacle and the second vector represents a probability of obstacle place occupation, and wherein the third neural network comprises a LSTM network that is to produce a future action sequence for the vehicle.

Example 16 includes the at least one non-transitory computer readable storage medium of Example 15, wherein to generate the first vector is further based on a road geometry and an environmental state, wherein to generate the second vector is further based on the road geometry and the environmental state, and wherein to determine the future trajectory for the vehicle is further based on the road geometry, the environmental state, a safety feedback provided by a safety monitor and a destination goal provided by a vehicle route planner.

Example 17 includes the at least one non-transitory computer readable storage medium of Example 16, wherein the instructions, when executed, further cause the computing system to issue actuation commands to navigate the vehicle based on the future trajectory for the vehicle.

Example 18 includes the at least one non-transitory computer readable storage medium of Example 17, wherein the instructions, when executed, further cause the computing system to monitor the actuation commands to navigate the vehicle, restrict one or more of the actuation commands to moderate an unsafe condition, and provide information for the safety feedback.

Example 19 includes the at least one non-transitory computer readable storage medium of any of Examples 14-18, wherein one or more of a limited set of road geometries or a set of minimum distance safety metrics is used to train the first neural network, the second neural network, and the third neural network together as a unit.

Example 20 includes a method of operating an autonomous vehicle comprising generating, via a first neural network, a first vector representing a prediction of future behavior of a vehicle based on a current vehicle position and a vehicle velocity, generating, via a second neural network, a second vector representing a prediction of future behavior of an external obstacle based on a current obstacle position and an obstacle velocity, and determining, via a third neural network, a future trajectory for the vehicle based on the first vector and the second vector, the future trajectory representing a sequence of planned future behaviors for the vehicle.

Example 21 includes the method of Example 20, wherein the first neural network comprises a long short-term (LSTM) network that is to produce predicted place cell activations for the vehicle and the first vector represents a probability of vehicle place occupation, wherein the second neural network comprises a LSTM network that is to produce predicted place cell activations for the external obstacle and the second vector represents a probability of obstacle place occupation, and wherein the third neural network comprises a LSTM network that is to produce a future action sequence for the vehicle.

Example 22 includes the method of Example 21, wherein generating the first vector is further based on a road geometry and an environmental state, wherein generating the second vector is further based on the road geometry and the environmental state, and wherein determining the future trajectory for the vehicle is further based on the road geometry, the environmental state, a safety feedback provided by a safety monitor and a destination goal provided by a vehicle route planner.

Example 23 includes the method of Example 22, further comprising issuing actuation commands to navigate the vehicle based on the future trajectory for the vehicle.

Example 24 includes the method of Example 23, further comprising monitoring the actuation commands to navigate the vehicle, restricting one or more of the actuation commands to moderate an unsafe condition, and providing information for the safety feedback.

Example 25 includes the method of any of Examples 20-24, wherein one or more of a limited set of road geometries or a set of minimum distance safety metrics is used to train the first neural network, the second neural network, and the third neural network together as a unit.

Example 26 includes an apparatus comprising means for performing the method of any of Examples 20-24.

Thus, technology described herein provides for generalization of driving experiences independent of location, number of agents involved and external conditions, even when an abundance of data may not be available. The technology also enables an autonomous vehicle system to handle previously unseen driving conditions safely based on encoding safe driving knowledge into cognitive spaces.

Embodiments are applicable for use with all types of semiconductor integrated circuit ("IC") chips. Examples of these IC chips include but are not limited to processors, controllers, chip set components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A vehicle computing system comprising:
    a sensor interface to obtain data for a vehicle and data for one or more external obstacles; and
    a processor coupled to the sensor interface, the processor including one or more substrates and logic coupled to the one or more substrates, wherein the logic is implemented at least partly in one or more of configurable logic or fixed-functionality hardware logic, the logic coupled to the one or more substrates to:
        generate, via a first neural network, a first vector representing a prediction of future behavior of the vehicle based on a current vehicle position and a vehicle velocity, wherein the first neural network is to produce predicted place cell activations for the vehicle and the first vector represents a probability of vehicle place occupation;
        generate, via a second neural network, a second vector representing a prediction of future behavior of an external obstacle based on a current obstacle position and an obstacle velocity, wherein the second neural network is to produce predicted place cell activations for the external obstacle and the second vector represents a probability of obstacle place occupation; and
        determine, via a third neural network, a future planned trajectory for the vehicle based on the first vector, the second vector and a route planning input, the future planned trajectory representing a sequence of planned future behaviors for the vehicle.

2. The system of claim 1, wherein the first neural network comprises a long short-term (LSTM) network, wherein the second neural network comprises a LSTM network, and wherein the third neural network comprises a LSTM network that is to produce a future action sequence for the vehicle.

3. The system of claim 2, wherein to generate the first vector is further based on a road geometry and an environmental state, wherein to generate the second vector is further based on the road geometry and the environmental state, and wherein to determine the future trajectory for the vehicle is further based on the road geometry, the environmental state, a safety feedback provided by a safety monitor and a destination goal provided by a vehicle route planner.

4. The system of claim 3, wherein the logic is further to issue actuation commands to navigate the vehicle based on the future trajectory for the vehicle.

5. The system of claim 4, wherein the logic further comprises a safety component to:
    monitor the actuation commands to navigate the vehicle;
    restrict one or more of the actuation commands to moderate an unsafe condition; and
    provide information for the safety feedback.

6. The system of claim 4, wherein one or more of a limited set of road geometries or a set of minimum distance safety metrics is used to train the system.

7. A semiconductor apparatus comprising:
    one or more substrates; and
    logic coupled to the one or more substrates, wherein the logic is implemented at least partly in one or more of configurable logic or fixed-functionality hardware logic, the logic coupled to the one or more substrates to:
        generate, via a first neural network, a first vector representing a prediction of future behavior of a vehicle based on a current vehicle position and a vehicle velocity, wherein the first neural network is to produce predicted place cell activations for the vehicle and the first vector represents a probability of vehicle place occupation;
        generate, via a second neural network, a second vector representing a prediction of future behavior of an external obstacle based on a current obstacle position and an obstacle velocity, wherein the second neural network is to produce predicted place cell activations for the external obstacle and the second vector represents a probability of obstacle place occupation; and
        determine, via a third neural network, a future planned trajectory for the vehicle based on the first vector, the second vector and a route planning input, the future planned trajectory representing a sequence of planned future behaviors for the vehicle.

8. The semiconductor apparatus of claim 7, wherein the first neural network comprises a long short-term (LSTM) network, wherein the second neural network comprises a LSTM network, and wherein the third neural network comprises a LSTM network that is to produce a future action sequence for the vehicle.

9. The semiconductor apparatus of claim 8, wherein to generate the first vector is further based on a road geometry and an environmental state, wherein to generate the second vector is further based on the road geometry and the environmental state, and wherein to determine the future trajectory for the vehicle is further based on the road geometry, the environmental state, a safety feedback provided by a safety monitor and a destination goal provided by a vehicle route planner.

10. The semiconductor apparatus of claim 9, wherein the logic is further to issue actuation commands to navigate the vehicle based on the future trajectory for the vehicle.

11. The semiconductor apparatus of claim 10, wherein the logic further comprises a safety component to:
monitor the actuation commands to navigate the vehicle;
restrict one or more of the actuation commands to moderate an unsafe condition; and
provide information for the safety feedback.

12. The semiconductor apparatus of claim 10, wherein one or more of a limited set of road geometries or a set of minimum distance safety metrics is used to train the first neural network, the second neural network, and the third neural network together as a unit.

13. The semiconductor apparatus of claim 7, wherein the logic coupled to the one or more substrates includes transistor channel regions that are positioned within the one or more substrates.

14. At least one non-transitory computer readable storage medium comprising a set of instructions which, when executed by a computing system, cause the computing system to:
generate, via a first neural network, a first vector representing a prediction of future behavior of a vehicle based on a current vehicle position and a vehicle velocity, wherein the first neural network is to produce predicted place cell activations for the vehicle and the first vector represents a probability of vehicle place occupation;
generate, via a second neural network, a second vector representing a prediction of future behavior of an external obstacle based on a current obstacle position and an obstacle velocity wherein the second neural network is to produce predicted place cell activations for the external obstacle and the second vector represents a probability of obstacle place occupation; and
determine, via a third neural network, a future planned trajectory for the vehicle based on the first vector, the second vector and a route planning input, the future planned trajectory representing a sequence of planned future behaviors for the vehicle.

15. The at least one non-transitory computer readable storage medium of claim 14, wherein the first neural network comprises a long short-term (LSTM) network, wherein the second neural network comprises a LSTM network, and wherein the third neural network comprises a LSTM network that is to produce a future action sequence for the vehicle.

16. The at least one non-transitory computer readable storage medium of claim 15, wherein to generate the first vector is further based on a road geometry and an environmental state, wherein to generate the second vector is further based on the road geometry and the environmental state, and wherein to determine the future trajectory for the vehicle is further based on the road geometry, the environmental state, a safety feedback provided by a safety monitor and a destination goal provided by a vehicle route planner.

17. The at least one non-transitory computer readable storage medium of claim 16, wherein the instructions, when executed, further cause the computing system to issue actuation commands to navigate the vehicle based on the future trajectory for the vehicle.

18. The at least one non-transitory computer readable storage medium of claim 17, wherein the instructions, when executed, further cause the computing system to:
monitor the actuation commands to navigate the vehicle;
restrict one or more of the actuation commands to moderate an unsafe condition; and
provide information for the safety feedback.

19. The at least one non-transitory computer readable storage medium of claim 17, wherein one or more of a limited set of road geometries or a set of minimum distance safety metrics is used to train the first neural network, the second neural network, and the third neural network together as a unit.

20. A method of operating an autonomous vehicle comprising:
generating, via a first neural network, a first vector representing a prediction of future behavior of a vehicle based on a current vehicle position and a vehicle velocity, wherein the first neural network produces predicted place cell activations for the vehicle and the first vector represents a probability of vehicle place occupation;
generating, via a second neural network, a second vector representing a prediction of future behavior of an external obstacle based on a current obstacle position and an obstacle velocity wherein the second neural network produces predicted place cell activations for the external obstacle and the second vector represents a probability of obstacle place occupation; and
determining, via a third neural network, a future planned trajectory for the vehicle based on the first vector, the second vector and a route planning input, the future planned trajectory representing a sequence of planned future behaviors for the vehicle.

21. The method of claim 20, wherein the first neural network comprises a long short-term (LSTM) network, wherein the second neural network comprises a LSTM network, and wherein the third neural network comprises a LSTM network that is to produce a future action sequence for the vehicle.

22. The method of claim 21, wherein generating the first vector is further based on a road geometry and an environmental state, wherein generating the second vector is further based on the road geometry and the environmental state, and wherein determining the future trajectory for the vehicle is further based on the road geometry, the environmental state, a safety feedback provided by a safety monitor and a destination goal provided by a vehicle route planner.

23. The method of claim 22, further comprising issuing actuation commands to navigate the vehicle based on the future trajectory for the vehicle.

24. The method of claim 23, further comprising:
monitoring the actuation commands to navigate the vehicle;
restricting one or more of the actuation commands to moderate an unsafe condition; and
providing information for the safety feedback.

25. The method of claim 23, wherein one or more of a limited set of road geometries or a set of minimum distance safety metrics is used to train the first neural network, the second neural network, and the third neural network together as a unit.

* * * * *

UNITED STATES PATENT AND TRADEMARK OFFICE
CERTIFICATE OF CORRECTION

PATENT NO. : 11,702,105 B2
APPLICATION NO. : 16/914298
DATED : July 18, 2023
INVENTOR(S) : Ignacio J. Alvarez et al.

It is certified that error appears in the above-identified patent and that said Letters Patent is hereby corrected as shown below:

In the Specification

Column 17, Lines 49-50: delete "long short-term (LSTM) network" and insert --long short-term memory (LSTM) network-- therefor.

Column 18, Line 31: delete "long short-term (LSTM) network" and insert --long short-term memory (LSTM) network-- therefor.

Column 19, Lines 16-17: delete "long short-term (LSTM) network" and insert --long short-term memory (LSTM) network-- therefor.

Column 19, Lines 66-67: delete "long short-term (LSTM) network" and insert --long short-term memory (LSTM) network-- therefor.

In the Claims

Claim 2, Column 21, Line 66: delete "long short-term (LSTM) network" and insert --long short-term memory (LSTM) network-- therefor.

Claim 8, Column 22, Lines 51-52: delete "long short-term (LSTM) network" and insert --long short-term memory (LSTM) network-- therefor.

Claim 14, Column 23, Line 30: delete "velocity" and insert --velocity,-- therefor.

Claim 15, Column 23, Line 41: delete "long short-term (LSTM) network" and insert --long short-term memory (LSTM) network-- therefor.

Claim 20, Column 24, Line 24: delete "velocity" and insert --velocity,-- therefor.

Signed and Sealed this
Second Day of July, 2024

Katherine Kelly Vidal
*Director of the United States Patent and Trademark Office*

Claim 21, Column 24, Line 34: delete "long short-term (LSTM) network" and insert --long short-term memory (LSTM) network-- therefor.